US011125982B2

(12) United States Patent
Jhang et al.

(10) Patent No.: US 11,125,982 B2
(45) Date of Patent: Sep. 21, 2021

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Taichung (TW); Maozong Lin, Fujian (CN); JianPeng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 234 days.

(21) Appl. No.: 16/435,569

(22) Filed: Jun. 10, 2019

(65) Prior Publication Data

US 2020/0285032 A1  Sep. 10, 2020

(30) Foreign Application Priority Data

Mar. 8, 2019  (CN) .......................... 201910175630.5

(51) Int. Cl.
| | |
|---|---|
| *G02B 9/60* | (2006.01) |
| *G02B 13/18* | (2006.01) |
| *G02B 5/00* | (2006.01) |
| *G02B 3/04* | (2006.01) |
| *G02B 13/00* | (2006.01) |
| *G02B 27/00* | (2006.01) |

(52) U.S. Cl.
CPC .............. *G02B 13/18* (2013.01); *G02B 9/60* (2013.01); *G02B 3/04* (2013.01); *G02B 5/005* (2013.01); *G02B 13/0045* (2013.01); *G02B 27/0025* (2013.01)

(58) Field of Classification Search
CPC .. G02B 13/0045; G02B 9/60; G02B 27/0025; G02B 13/18; G02B 5/005; G02B 3/04
USPC .................................. 359/714, 740, 763–766
See application file for complete search history.

(56) References Cited

U.S. PATENT DOCUMENTS

| | | | | |
|---|---|---|---|---|
| 4,451,125 A | * | 5/1984 | Sato ......................... | G02B 9/60 359/766 |
| 2010/0134904 A1 | | 6/2010 | Tsai | |

FOREIGN PATENT DOCUMENTS

| | | |
|---|---|---|
| CN | 204143050 | 2/2015 |
| CN | 108152922 | 6/2018 |
| JP | S6444907 | 2/1989 |

\* cited by examiner

*Primary Examiner* — Evelyn A Lester
(74) *Attorney, Agent, or Firm* — JCIPRNET

(57) ABSTRACT

An optical imaging lens including a first lens element, a second lens element, a third lens element, a fourth lens element and a fifth lens element having refracting power arranged in sequence from an object side to an image side is provided. Twice of an Abbe number of the fourth lens element is greater than a sum of an Abbe number of the second lens element, an Abbe number of the third lens element, and an Abbe number of the fifth lens element. Other optical imaging lenses are also provided.

19 Claims, 36 Drawing Sheets

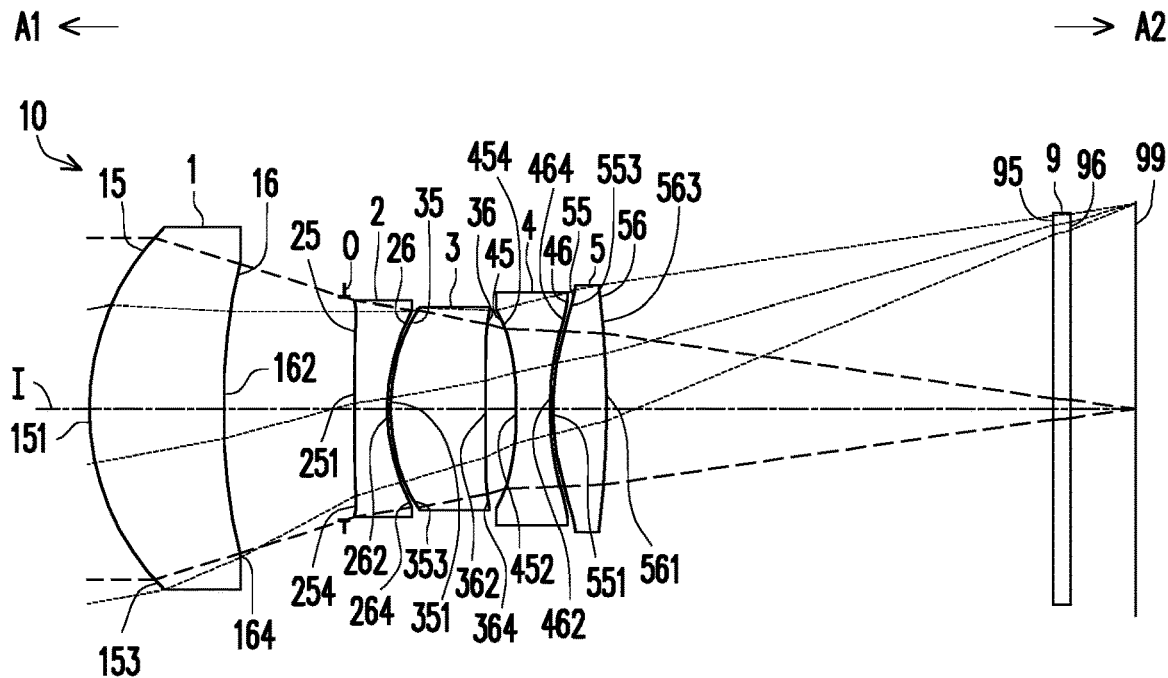
FIG. 6
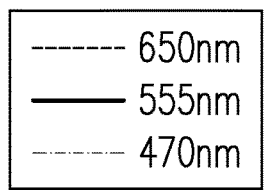
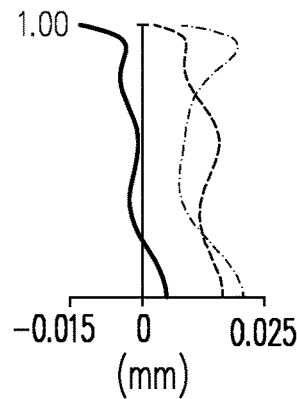
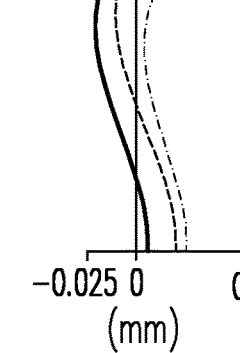
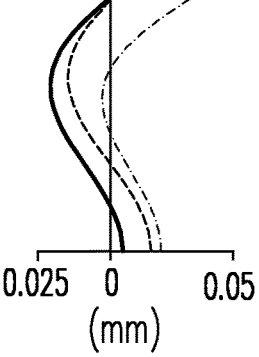
FIG. 7A  FIG. 7B  FIG. 7C  FIG. 7D

| First Embodiment |||||||
|---|---|---|---|---|---|---|
| Effective focal length(EFL)=14.458 mm, Half field of view(HFOV) =9.760°,System length(TTL)= 12.680 mm, F-number(Fno)=3.340, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.117 | 1.636 | 1.545 | 55.987 | 7.803 |
| | Image-side surface 16 | 9.443 | 1.450 | | | |
| Aperture 0 | | Infinity | 0.127 | | | |
| Second lens element 2 | Object-side surface 25 | 54.627 | 0.396 | 1.661 | 20.373 | -3.652 |
| | Image-side surface 26 | 2.326 | 0.040 | | | |
| Third lens element 3 | Object-side surface 35 | 2.387 | 1.155 | 1.545 | 55.987 | 4.628 |
| | Image-side surface 36 | 35.275 | 0.374 | | | |
| Fourth lens element 4 | Object-side surface 45 | -4.661 | 0.408 | 1.545 | 55.987 | -3.359 |
| | Image-side surface 46 | 3.120 | 0.040 | | | |
| Fifth lens element 5 | Object-side surface 55 | 3.054 | 0.637 | 1.642 | 22.409 | 4.201 |
| | Image-side surface 56 | -22.811 | 5.420 | | | |
| Filter 9 | Object-side surface 95 | Infinity | 0.210 | 1.517 | 64.167 | |
| | Image-side surface 96 | Infinity | 0.787 | | | |
| | Image plane 99 | Infinity | | | | |

FIG. 8

A1 ←  → A2
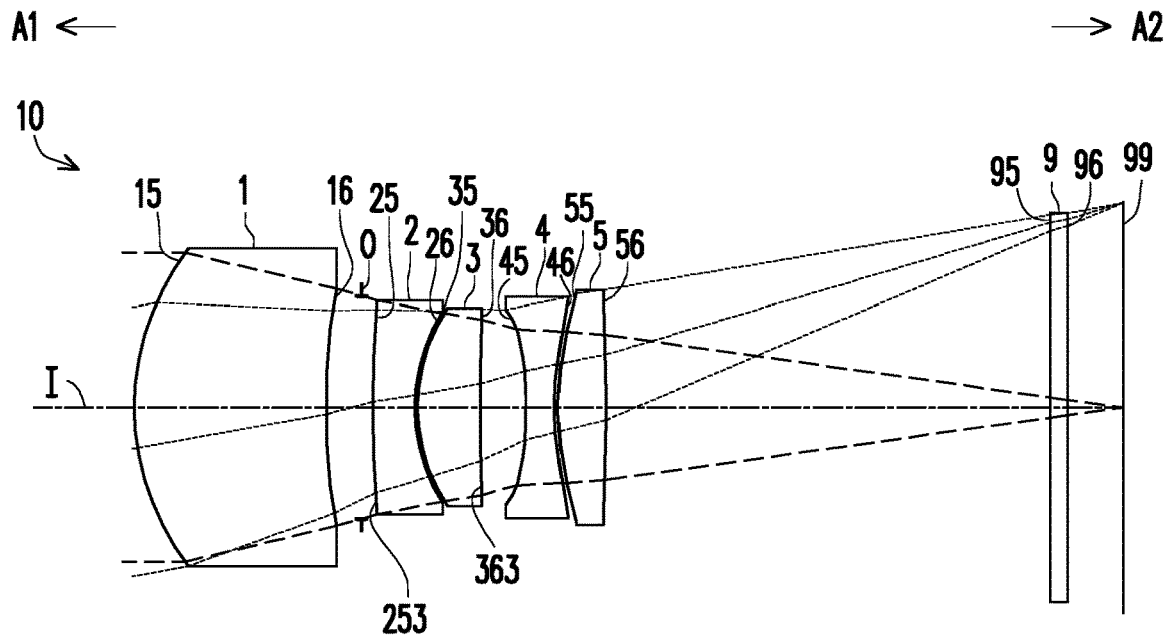
FIG. 10
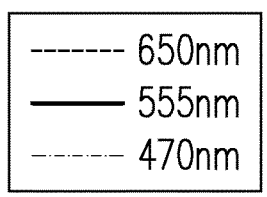
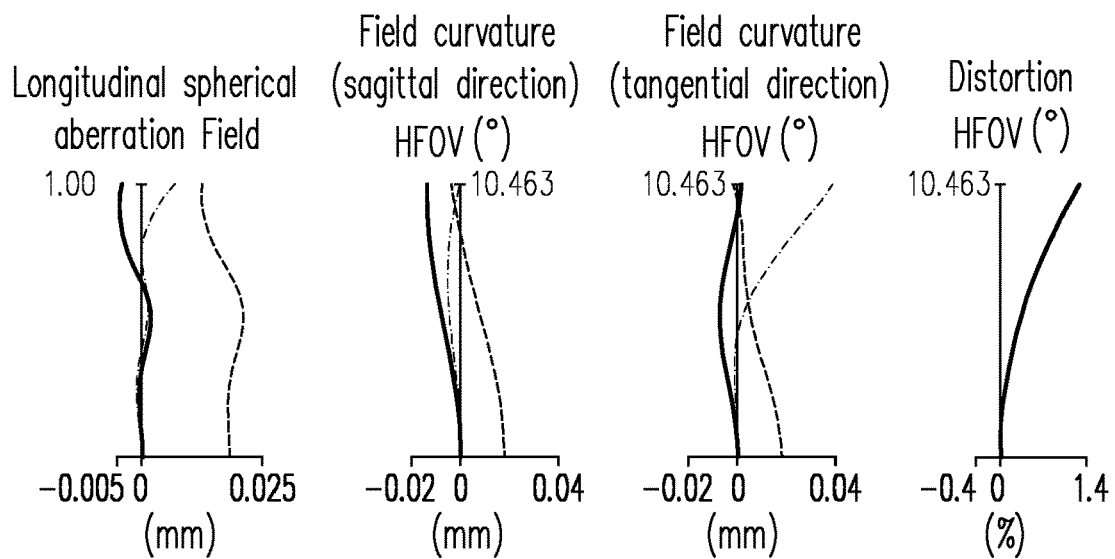
FIG. 11A   FIG. 11B  FIG. 11C FIG. 11D

| Second Embodiment |||||||
|---|---|---|---|---|---|---|
| Effective focal length(EFL)=13.373 mm, Half field of view(HFOV) =10.463°,System length(TTL)= 12.043 mm, F-number(Fno)=3.330, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.122 | 2.334 | 1.545 | 55.987 | 7.903 |
| | Image-side surface 16 | 8.298 | 0.440 | | | |
| Aperture 0 | | Infinity | 0.132 | | | |
| Second lens element 2 | Object-side surface 25 | 16.940 | 0.507 | 1.642 | 22.409 | -3.713 |
| | Image-side surface 26 | 2.080 | 0.040 | | | |
| Third lens element 3 | Object-side surface 35 | 2.163 | 0.766 | 1.545 | 55.987 | 4.268 |
| | Image-side surface 36 | 26.182 | 0.554 | | | |
| Fourth lens element 4 | Object-side surface 45 | -5.349 | 0.345 | 1.545 | 55.987 | -3.771 |
| | Image-side surface 46 | 3.427 | 0.040 | | | |
| Fifth lens element 5 | Object-side surface 55 | 3.185 | 0.586 | 1.642 | 22.409 | 4.921 |
| | Image-side surface 56 | -8382882.496 | 5.420 | | | |
| Filter 9 | Object-side surface 95 | Infinity | 0.210 | 1.517 | 64.167 | |
| | Image-side surface 96 | Infinity | 0.669 | | | |
| | Image plane 99 | Infinity | | | | |

FIG. 12

| Surface | K | $a_2$ | $a_4$ | $a_6$ | $a_8$ |
|---|---|---|---|---|---|
| 15 | 0.000000E+00 | 0.000000E+00 | -9.578179E-04 | 4.216287E-05 | -4.901345E-05 |
| 16 | 0.000000E+00 | 0.000000E+00 | -9.904409E-05 | -1.553613E-04 | -7.843106E-06 |
| 25 | 0.000000E+00 | 0.000000E+00 | -3.753329E-03 | 7.324448E-04 | 1.583634E-03 |
| 26 | 0.000000E+00 | 0.000000E+00 | -2.396413E-02 | 5.261572E-03 | 1.298949E-03 |
| 35 | 0.000000E+00 | 0.000000E+00 | -1.698566E-02 | 8.817693E-03 | -7.311424E-05 |
| 36 | 0.000000E+00 | 0.000000E+00 | -4.149087E-03 | 6.684152E-03 | -5.114222E-03 |
| 45 | 0.000000E+00 | 0.000000E+00 | -2.278609E-02 | -1.590058E-02 | 1.209140E-03 |
| 46 | 0.000000E+00 | 0.000000E+00 | -2.887226E-02 | -1.166191E-02 | 9.170055E-03 |
| 55 | 0.000000E+00 | 0.000000E+00 | -3.689887E-02 | -9.331990E-04 | 8.819012E-03 |
| 56 | 0.000000E+00 | 0.000000E+00 | -1.668139E-02 | 2.171893E-03 | -6.005434E-04 |
| Surface | $a_{10}$ | $a_{12}$ | | | |
| 15 | 4.803985E-06 | -6.061454E-07 | | | |
| 16 | 2.316462E-05 | -6.003910E-06 | | | |
| 25 | -4.290141E-04 | 2.169925E-06 | | | |
| 26 | 2.451191E-03 | -1.020772E-03 | | | |
| 35 | 1.040144E-03 | -5.037501E-04 | | | |
| 36 | -2.224684E-03 | 6.974731E-04 | | | |
| 45 | -5.686480E-03 | 1.953545E-03 | | | |
| 46 | -2.252602E-03 | 8.207543E-05 | | | |
| 55 | -2.448756E-03 | -6.296366E-05 | | | |
| 56 | 1.957195E-03 | -6.017703E-04 | | | |

FIG. 13

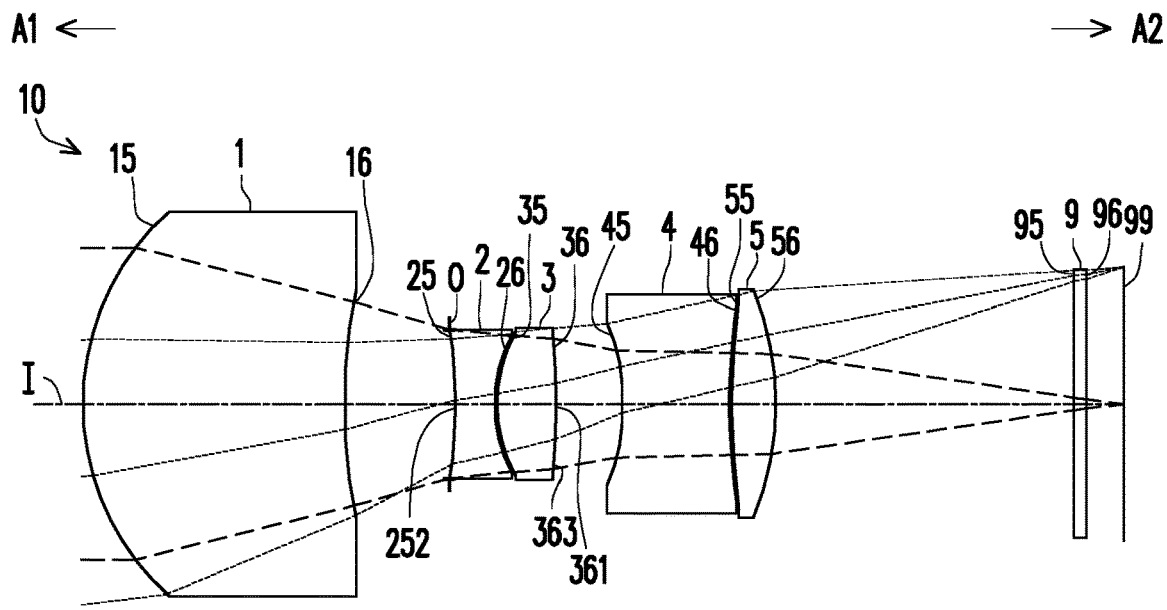
FIG. 14
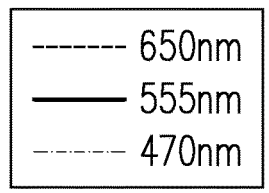
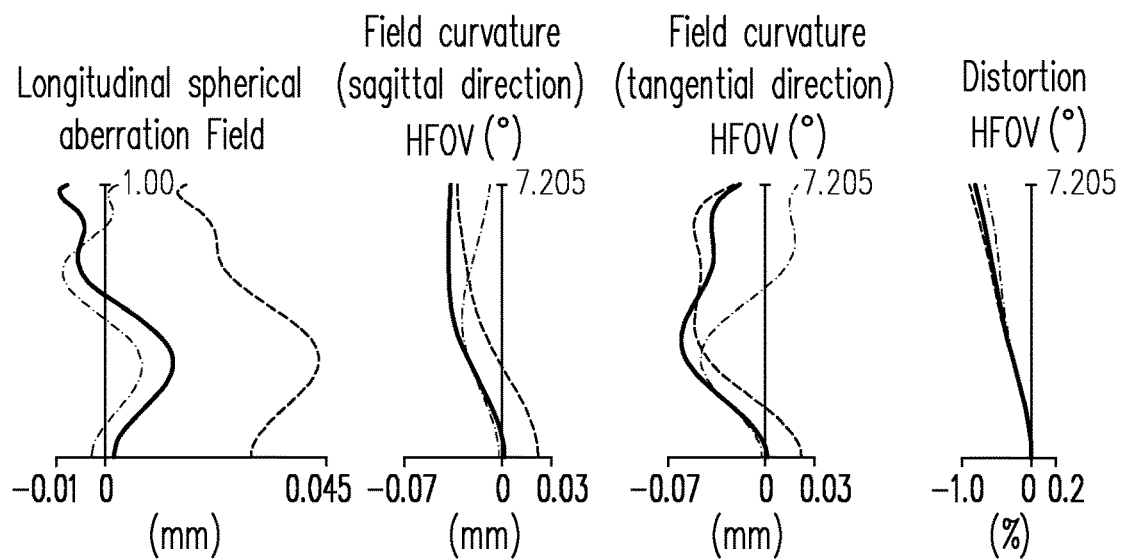
FIG. 15A    FIG. 15B   FIG. 15C   FIG. 15D

| Third Embodiment | | | | | | |
|---|---|---|---|---|---|---|
| Effective focal length(EFL)=19.971 mm, Half field of view(HFOV) =7.205°, System length(TTL)= 18.836 mm, F-number(Fno)=3.468, Image height(ImgH) =2.502 mm | | | | | | |
| Element | Surface | Radius (mm) | Thickness (mm) | Refractive index | Abbe number | Focal length (mm) |
| Object | | | Infinity | | | |
| First lens element 1 | Object-side surface 15 | 4.658 | 4.734 | 1.545 | 55.987 | 11.378 |
| | Image-side surface 16 | 11.916 | 1.895 | | | |
| Aperture 0 | | Infinity | 0.112 | | | |
| Second lens element 2 | Object-side surface 25 | -10.992 | 0.720 | 1.642 | 22.409 | -3.287 |
| | Image-side surface 26 | 2.706 | 0.040 | | | |
| Third lens element 3 | Object-side surface 35 | 2.750 | 1.069 | 1.545 | 55.987 | 4.460 |
| | Image-side surface 36 | -18.428 | 1.193 | | | |
| Fourth lens element 4 | Object-side surface 45 | -5.233 | 1.932 | 1.545 | 55.987 | -4.655 |
| | Image-side surface 46 | 5.591 | 0.040 | | | |
| Fifth lens element 5 | Object-side surface 55 | 6.898 | 0.802 | 1.642 | 22.409 | 5.218 |
| | Image-side surface 56 | -6.316 | 5.420 | | | |
| Filter 9 | Object-side surface 95 | Infinity | 0.210 | 1.517 | 64.167 | |
| | Image-side surface 96 | Infinity | 0.669 | | | |
| | Image plane 99 | Infinity | | | | |

FIG. 16

| Surface | K | $a_2$ | $a_4$ | $a_6$ | $a_8$ |
|---|---|---|---|---|---|
| 15 | 0.000000E+00 | 0.000000E+00 | -1.086694E-04 | -6.338781E-06 | 7.194987E-07 |
| 16 | 0.000000E+00 | 0.000000E+00 | 9.580597E-04 | -1.922368E-04 | 1.104150E-04 |
| 25 | 0.000000E+00 | 0.000000E+00 | -9.796797E-03 | 4.106279E-03 | -1.577333E-03 |
| 26 | 0.000000E+00 | 0.000000E+00 | -1.621514E-02 | 7.138786E-03 | -1.693670E-03 |
| 35 | 0.000000E+00 | 0.000000E+00 | -1.000995E-02 | 5.361510E-03 | -1.374235E-03 |
| 36 | 0.000000E+00 | 0.000000E+00 | -5.742855E-03 | 2.630305E-03 | -1.746045E-03 |
| 45 | 0.000000E+00 | 0.000000E+00 | -1.217367E-02 | -3.678433E-03 | 4.824211E-03 |
| 46 | 0.000000E+00 | 0.000000E+00 | -2.742462E-02 | -6.645334E-03 | 9.058952E-03 |
| 55 | 0.000000E+00 | 0.000000E+00 | -2.143398E-02 | -4.794143E-03 | 6.620172E-03 |
| 56 | 0.000000E+00 | 0.000000E+00 | -5.030732E-03 | 2.932430E-03 | -1.625350E-03 |
| Surface | $a_{10}$ | $a_{12}$ | | | |
| 15 | -7.141956E-08 | 3.637115E-09 | | | |
| 16 | -1.648733E-05 | 1.342839E-06 | | | |
| 25 | 6.753025E-04 | -1.229867E-04 | | | |
| 26 | 1.845586E-03 | -6.313814E-04 | | | |
| 35 | 1.520229E-03 | -5.939088E-04 | | | |
| 36 | 6.645692E-04 | -1.859854E-04 | | | |
| 45 | -2.538212E-03 | 4.410698E-04 | | | |
| 46 | -2.478384E-03 | 2.129598E-04 | | | |
| 55 | -1.684250E-03 | 1.299272E-04 | | | |
| 56 | 4.645376E-04 | -4.760505E-05 | | | |

FIG. 17

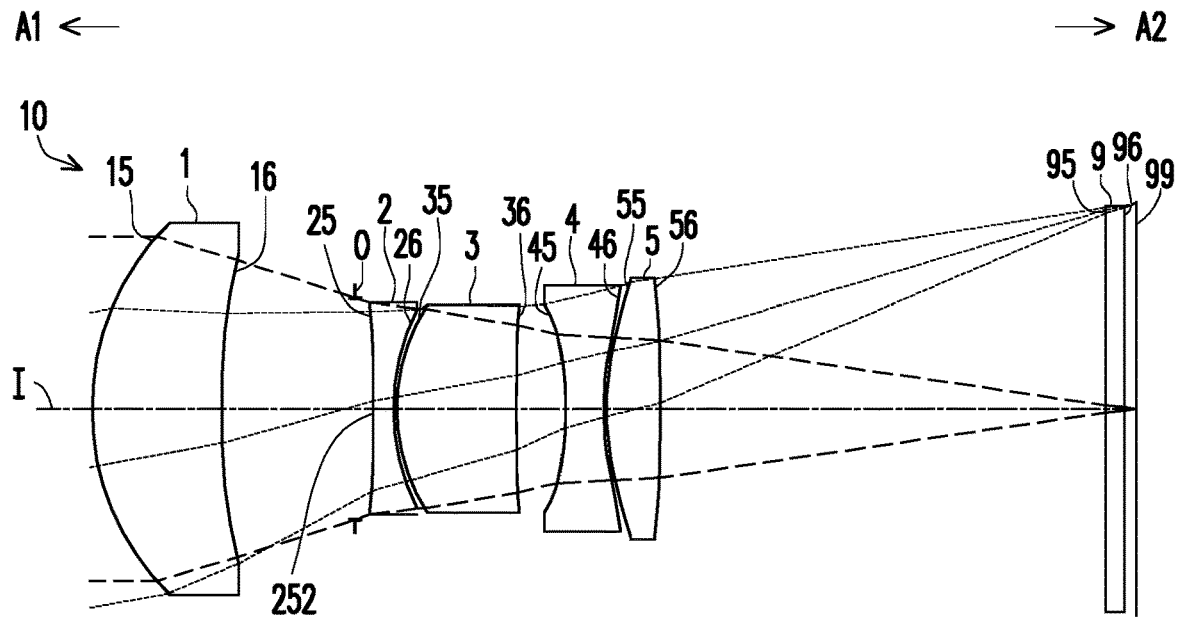
FIG. 18
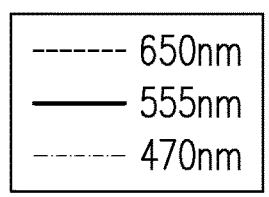
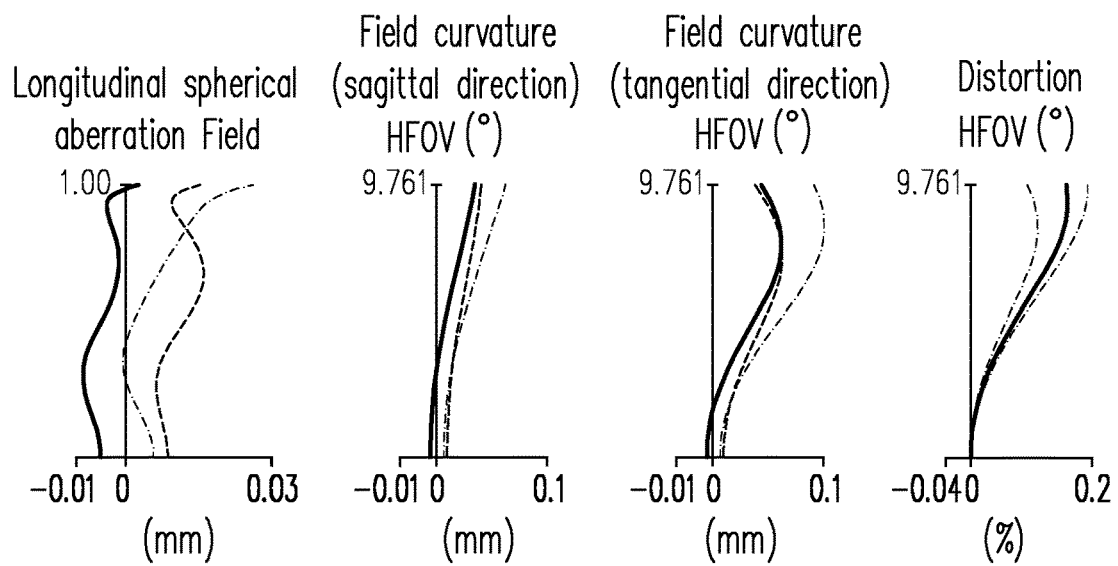
FIG. 19A  FIG. 19B  FIG. 19C  FIG. 19D

| Fourth Embodiment |||||||
|---|---|---|---|---|---|---|
| Effective focal length(EFL)=14.508 mm, Half field of view(HFOV) =9.761°,System length(TTL)= 12.689 mm, F-number(Fno)=3.340, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.164 | 1.576 | 1.545 | 55.987 | 7.961 |
| | Image-side surface 16 | 9.571 | 1.621 | | | |
| Aperture 0 | | Infinity | 0.226 | | | |
| Second lens element 2 | Object-side surface 25 | -30.453 | 0.240 | 1.642 | 22.409 | -3.470 |
| | Image-side surface 26 | 2.433 | 0.040 | | | |
| Third lens element 3 | Object-side surface 35 | 2.307 | 1.461 | 1.545 | 55.987 | 4.301 |
| | Image-side surface 36 | 98.619 | 0.591 | | | |
| Fourth lens element 4 | Object-side surface 45 | -5.043 | 0.460 | 1.545 | 55.987 | -3.506 |
| | Image-side surface 46 | 3.188 | 0.040 | | | |
| Fifth lens element 5 | Object-side surface 55 | 3.159 | 0.654 | 1.642 | 22.409 | 4.494 |
| | Image-side surface 56 | -33.799 | 5.420 | | | |
| Filter 9 | Object-side surface 95 | Infinity | 0.210 | 1.517 | 64.167 | |
| | Image-side surface 96 | Infinity | 0.152 | | | |
| | Image plane 99 | Infinity | | | | |

FIG. 20

| Surface | K | $a_2$ | $a_4$ | $a_6$ | $a_8$ |
|---|---|---|---|---|---|
| 15 | 0.000000E+00 | 0.000000E+00 | -3.293936E-04 | 1.051843E-04 | -7.677191E-06 |
| 16 | 0.000000E+00 | 0.000000E+00 | 1.621935E-03 | 8.177549E-05 | -1.221583E-05 |
| 25 | 0.000000E+00 | 0.000000E+00 | -7.456131E-03 | -1.395802E-03 | 9.814451E-04 |
| 26 | 0.000000E+00 | 0.000000E+00 | -2.509485E-02 | 4.699834E-03 | 7.955788E-04 |
| 35 | 0.000000E+00 | 0.000000E+00 | -1.574691E-02 | 6.955963E-03 | 2.649144E-03 |
| 36 | 0.000000E+00 | 0.000000E+00 | 1.299520E-03 | 6.544757E-03 | -1.557003E-03 |
| 45 | 0.000000E+00 | 0.000000E+00 | -2.207785E-02 | -1.053145E-02 | -3.081315E-04 |
| 46 | 0.000000E+00 | 0.000000E+00 | -2.987209E-02 | -1.273507E-02 | 1.028586E-02 |
| 55 | 0.000000E+00 | 0.000000E+00 | -3.205507E-02 | -1.603585E-03 | 6.813774E-03 |
| 56 | 0.000000E+00 | 0.000000E+00 | -1.527464E-02 | 2.618517E-03 | -5.383940E-04 |
| Surface | $a_{10}$ | $a_{12}$ | | | |
| 15 | -1.874411E-08 | 9.969813E-09 | | | |
| 16 | -3.527762E-06 | 3.180382E-07 | | | |
| 25 | -7.960627E-05 | -7.360268E-05 | | | |
| 26 | 1.411553E-03 | -8.927202E-04 | | | |
| 35 | -4.815677E-04 | -1.935634E-04 | | | |
| 36 | -1.686883E-03 | 1.768368E-03 | | | |
| 45 | -1.139373E-03 | 1.331599E-03 | | | |
| 46 | -2.936870E-03 | 2.698170E-04 | | | |
| 55 | -1.913541E-03 | 6.263268E-05 | | | |
| 56 | 1.236018E-03 | -3.365561E-04 | | | |

FIG. 21

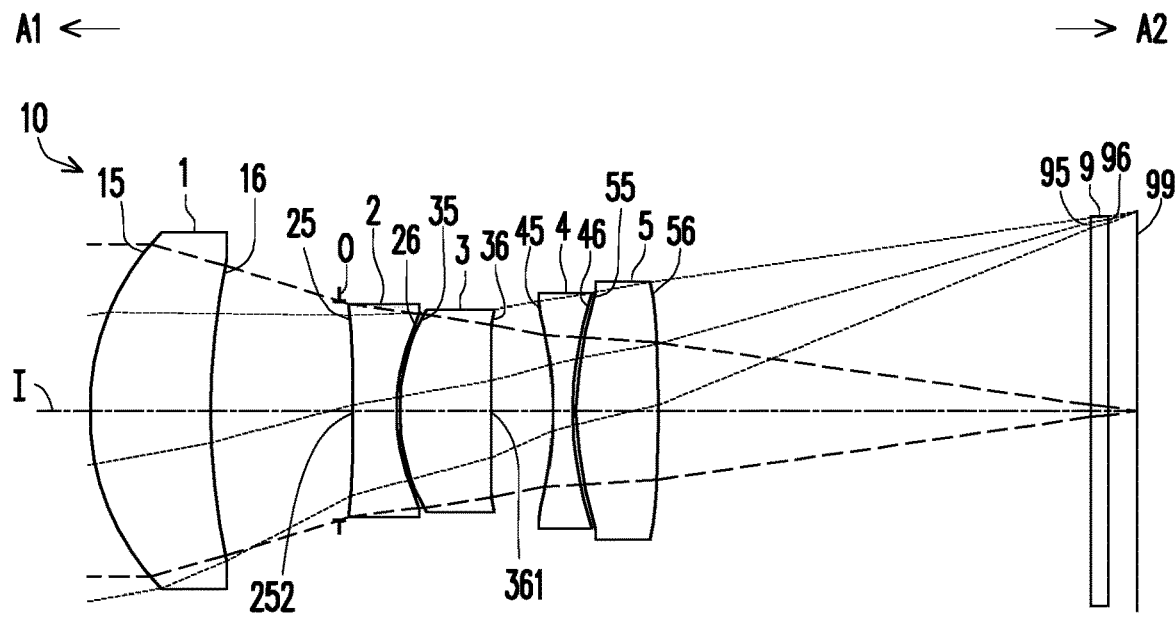
FIG. 22
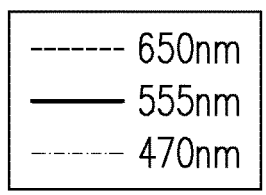
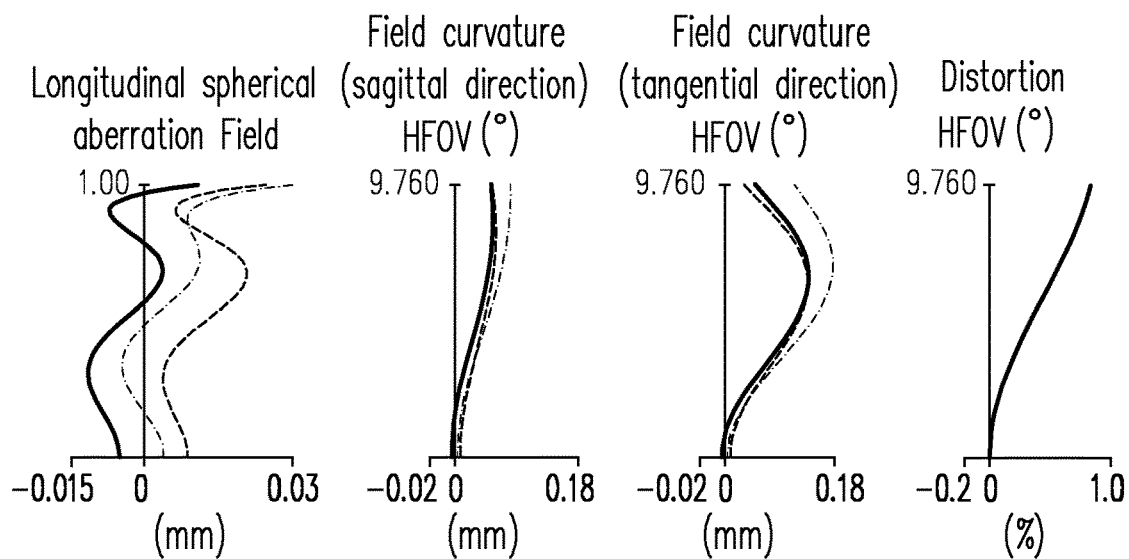
FIG. 23A  FIG. 23B  FIG. 23C  FIG. 23D

| Fifth Embodiment |||||||
|---|---|---|---|---|---|---|
| Effective focal length(EFL)=14.411 mm, Half field of view(HFOV) =9.760°,System length(TTL)= 13.091 mm, F-number(Fno)=3.340, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.253 | 1.515 | 1.545 | 55.987 | 8.136 |
| | Image-side surface 16 | 10.135 | 1.612 | | | |
| Aperture 0 | | Infinity | 0.159 | | | |
| Second lens element 2 | Object-side surface 25 | -33.879 | 0.550 | 1.642 | 22.409 | -3.461 |
| | Image-side surface 26 | 2.414 | 0.040 | | | |
| Third lens element 3 | Object-side surface 35 | 2.503 | 1.151 | 1.545 | 55.987 | 4.278 |
| | Image-side surface 36 | -29.602 | 0.766 | | | |
| Fourth lens element 4 | Object-side surface 45 | -4.415 | 0.240 | 1.545 | 55.987 | -3.627 |
| | Image-side surface 46 | 3.664 | 0.040 | | | |
| Fifth lens element 5 | Object-side surface 55 | 3.307 | 1.032 | 1.642 | 22.409 | 4.518 |
| | Image-side surface 56 | -22.147 | 5.420 | | | |
| Filter 9 | Object-side surface 95 | Infinity | 0.210 | 1.517 | 64.167 | |
| | Image-side surface 96 | Infinity | 0.355 | | | |
| Image plane 99 | | Infinity | | | | |

FIG. 24

| Surface | K | $a_2$ | $a_4$ | $a_6$ | $a_8$ |
|---|---|---|---|---|---|
| 15 | 0.000000E+00 | 0.000000E+00 | -1.964187E-04 | 1.355587E-04 | -8.558263E-06 |
| 16 | 0.000000E+00 | 0.000000E+00 | 1.522782E-03 | 5.852176E-05 | 7.168300E-07 |
| 25 | 0.000000E+00 | 0.000000E+00 | -4.867229E-03 | -2.454128E-03 | 1.233114E-03 |
| 26 | 0.000000E+00 | 0.000000E+00 | -2.859739E-02 | 4.048180E-03 | 5.130371E-05 |
| 35 | 0.000000E+00 | 0.000000E+00 | -1.844880E-02 | 6.058493E-03 | 3.144653E-03 |
| 36 | 0.000000E+00 | 0.000000E+00 | 8.757720E-03 | 7.565977E-03 | 9.015043E-04 |
| 45 | 0.000000E+00 | 0.000000E+00 | 9.298712E-04 | 1.687896E-03 | -2.372680E-03 |
| 46 | 0.000000E+00 | 0.000000E+00 | -2.570919E-02 | -8.424075E-03 | 1.407248E-02 |
| 55 | 0.000000E+00 | 0.000000E+00 | -2.889837E-02 | -2.758391E-04 | 5.019780E-03 |
| 56 | 0.000000E+00 | 0.000000E+00 | -8.921580E-04 | -2.128549E-03 | 7.680497E-04 |
| Surface | $a_{10}$ | $a_{12}$ | | | |
| 15 | -4.499627E-08 | 9.559198E-08 | | | |
| 16 | -2.873036E-06 | 4.903204E-08 | | | |
| 25 | -8.103018E-05 | -4.504584E-05 | | | |
| 26 | 1.338169E-03 | -6.627035E-04 | | | |
| 35 | -4.411802E-04 | -1.976958E-04 | | | |
| 36 | -9.349218E-04 | 1.116968E-03 | | | |
| 45 | 3.316639E-03 | -4.412382E-04 | | | |
| 46 | -5.282075E-03 | 7.849316E-04 | | | |
| 55 | -1.815118E-03 | 1.398075E-04 | | | |
| 56 | -4.029340E-05 | -5.627969E-05 | | | |

FIG. 25

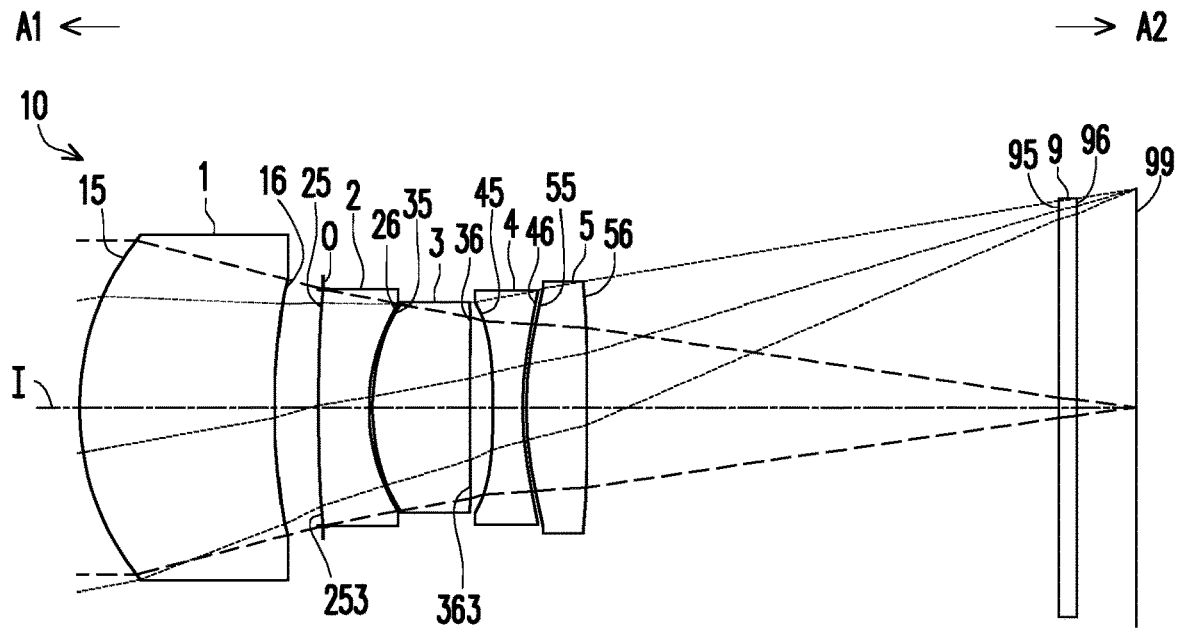
FIG. 26
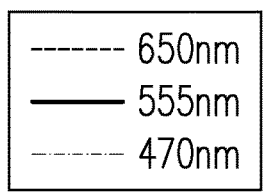
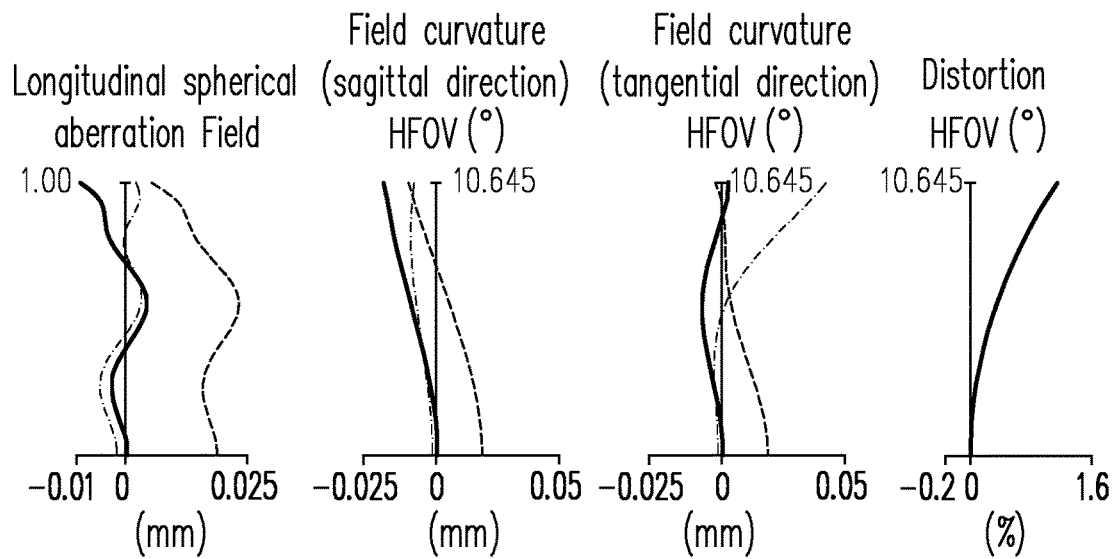
FIG. 27A  FIG. 27B  FIG. 27C  FIG. 27D

| Sixth Embodiment | | | | | | |
|---|---|---|---|---|---|---|
| Effective focal length(EFL)=13.121 mm, Half field of view(HFOV) =10.645°,System length(TTL)= 12.122 mm, F-number(Fno)=3.251, Image height(ImgH) =2.502 mm | | | | | | |
| Element | Surface | Radius (mm) | Thickness (mm) | Refractive index | Abbe number | Focal length (mm) |
| Object | | | Infinity | | | |
| First lens element 1 | Object-side surface 15 | 3.091 | 2.242 | 1.545 | 55.987 | 7.897 |
| | Image-side surface 16 | 8.110 | 0.529 | | | |
| Aperture 0 | | Infinity | -0.032 | | | |
| Second lens element 2 | Object-side surface 25 | 14.678 | 0.580 | 1.642 | 22.409 | -3.852 |
| | Image-side surface 26 | 2.098 | 0.040 | | | |
| Third lens element 3 | Object-side surface 35 | 2.322 | 1.118 | 1.545 | 55.987 | 4.391 |
| | Image-side surface 36 | 60.433 | 0.272 | | | |
| Fourth lens element 4 | Object-side surface 45 | -5.901 | 0.339 | 1.545 | 55.987 | -3.914 |
| | Image-side surface 46 | 3.422 | 0.040 | | | |
| Fifth lens element 5 | Object-side surface 55 | 3.387 | 0.694 | 1.642 | 22.409 | 5.135 |
| | Image-side surface 56 | -165.661 | 5.420 | | | |
| Filter 9 | Object-side surface 95 | Infinity | 0.210 | 1.517 | 64.167 | |
| | Image-side surface 96 | Infinity | 0.669 | | | |
| Image plane 99 | | Infinity | | | | |

FIG. 28

| Surface | K | $a_2$ | $a_4$ | $a_6$ | $a_8$ |
|---|---|---|---|---|---|
| 15 | 0.000000E+00 | 0.000000E+00 | -6.667427E-04 | 5.864222E-05 | -2.025802E-05 |
| 16 | 0.000000E+00 | 0.000000E+00 | 1.800787E-03 | 5.437437E-05 | -1.238410E-04 |
| 25 | 0.000000E+00 | 0.000000E+00 | -4.315372E-03 | -1.067400E-04 | 1.016283E-03 |
| 26 | 0.000000E+00 | 0.000000E+00 | -2.684122E-02 | 3.088546E-03 | 3.246080E-04 |
| 35 | 0.000000E+00 | 0.000000E+00 | -1.642360E-02 | 6.990811E-03 | 7.919323E-04 |
| 36 | 0.000000E+00 | 0.000000E+00 | -4.046562E-04 | 9.545784E-03 | -5.356493E-03 |
| 45 | 0.000000E+00 | 0.000000E+00 | -1.365677E-02 | -1.110007E-02 | 2.034082E-03 |
| 46 | 0.000000E+00 | 0.000000E+00 | -3.077710E-02 | -1.224811E-02 | 1.297278E-02 |
| 55 | 0.000000E+00 | 0.000000E+00 | -3.683764E-02 | -2.502201E-03 | 9.517080E-03 |
| 56 | 0.000000E+00 | 0.000000E+00 | -1.314327E-02 | 1.592959E-03 | -1.179930E-03 |
| Surface | $a_{10}$ | $a_{12}$ | | | |
| 15 | -1.201409E-06 | 7.022651E-09 | | | |
| 16 | -3.341160E-06 | 1.042683E-05 | | | |
| 25 | -1.761669E-04 | 1.323312E-05 | | | |
| 26 | 1.546126E-03 | -1.914455E-04 | | | |
| 35 | -4.551341E-04 | 4.746177E-04 | | | |
| 36 | -1.959096E-03 | -9.436930E-05 | | | |
| 45 | -5.492680E-03 | 1.024502E-03 | | | |
| 46 | -2.875015E-03 | 6.863771E-06 | | | |
| 55 | -2.421864E-03 | -1.576637E-04 | | | |
| 56 | 1.105252E-03 | -3.217918E-04 | | | |

FIG. 29

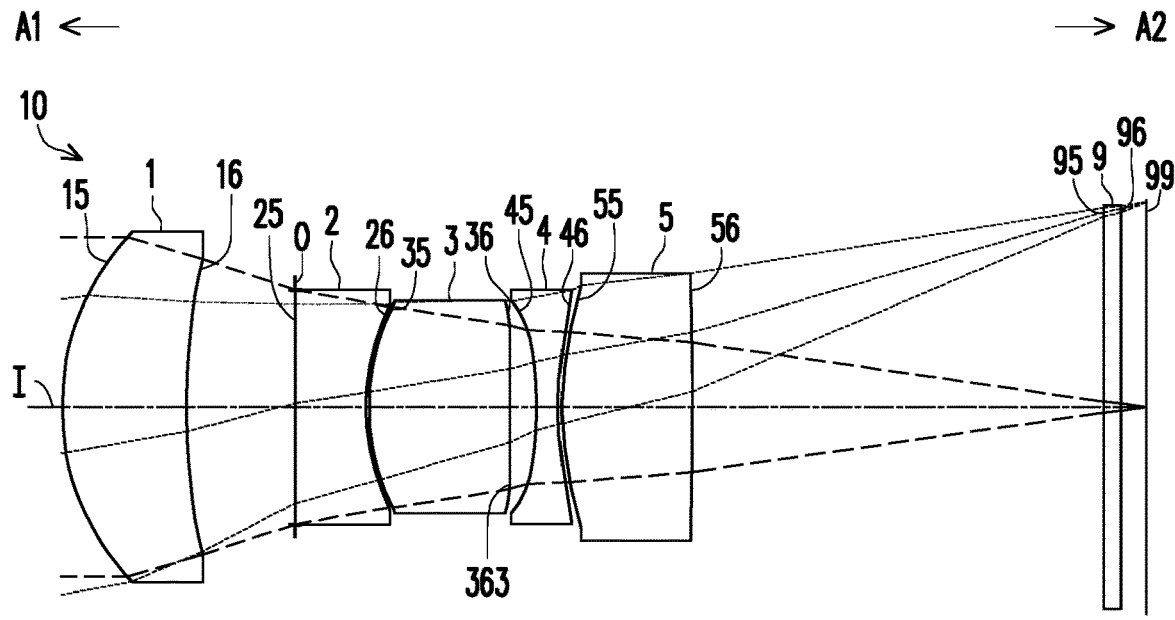
FIG. 30
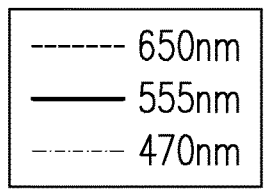
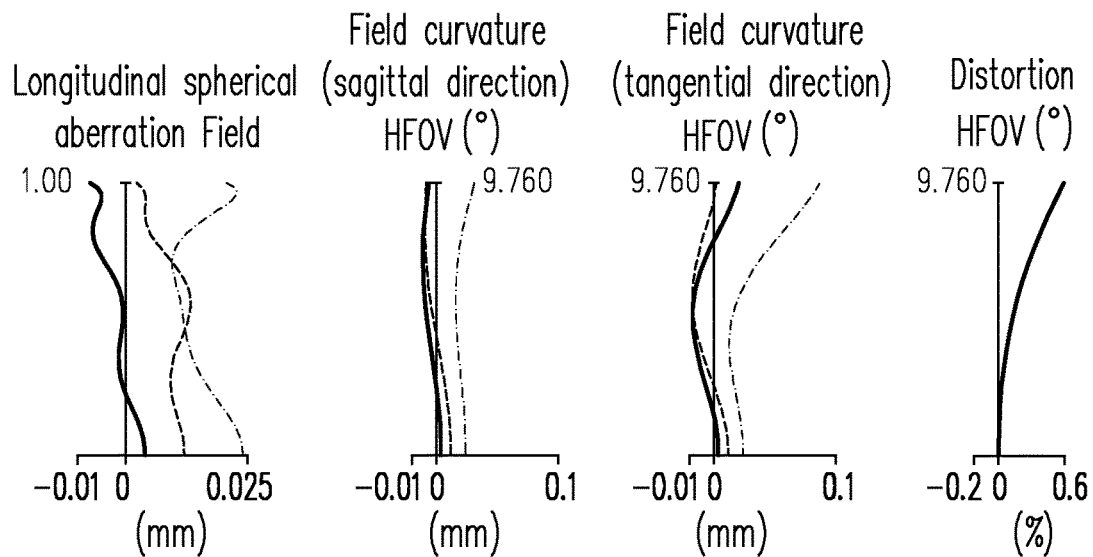
FIG. 31A   FIG. 31B   FIG. 31C   FIG. 31D

| Seventh Embodiment |||||||
|---|---|---|---|---|---|---|
| Effective focal length(EFL)=14.471 mm, Half field of view(HFOV) =9.760°,System length(TTL)= 13.173 mm, F-number(Fno)=3.350, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.127 | 1.515 | 1.545 | 55.987 | 7.909 |
| | Image-side surface 16 | 9.377 | 1.293 | | | |
| Aperture 0 | | Infinity | 0.030 | | | |
| Second lens element 2 | Object-side surface 25 | 108.523 | 0.852 | 1.642 | 22.409 | -3.900 |
| | Image-side surface 26 | 2.459 | 0.040 | | | |
| Third lens element 3 | Object-side surface 35 | 2.560 | 1.717 | 1.545 | 55.987 | 4.723 |
| | Image-side surface 36 | 250.989 | 0.323 | | | |
| Fourth lens element 4 | Object-side surface 45 | -5.128 | 0.259 | 1.545 | 55.987 | -3.808 |
| | Image-side surface 46 | 3.562 | 0.040 | | | |
| Fifth lens element 5 | Object-side surface 55 | 3.379 | 1.592 | 1.642 | 22.409 | 5.210 |
| | Image-side surface 56 | -1345.714 | 5.000 | | | |
| Filter 9 | Object-side surface 95 | Infinity | 0.210 | 1.517 | 64.167 | |
| | Image-side surface 96 | Infinity | 0.304 | | | |
| | Image plane 99 | Infinity | | | | |

FIG. 32

| Surface | K | $a_2$ | $a_4$ | $a_6$ | $a_8$ |
|---|---|---|---|---|---|
| 15 | 0.000000E+00 | 0.000000E+00 | -1.971422E-05 | 1.325351E-04 | -3.341568E-06 |
| 16 | 0.000000E+00 | 0.000000E+00 | 1.728223E-03 | 1.554219E-04 | -2.842385E-07 |
| 25 | 0.000000E+00 | 0.000000E+00 | -4.230353E-03 | 1.032756E-05 | 3.321600E-04 |
| 26 | 0.000000E+00 | 0.000000E+00 | -2.622749E-02 | 4.523059E-03 | 1.666114E-03 |
| 35 | 0.000000E+00 | 0.000000E+00 | -2.264383E-02 | 4.884355E-03 | 1.993943E-03 |
| 36 | 0.000000E+00 | 0.000000E+00 | 8.245303E-04 | -1.642388E-03 | -4.646598E-03 |
| 45 | 0.000000E+00 | 0.000000E+00 | -1.368519E-02 | -2.375551E-02 | 1.002241E-02 |
| 46 | 0.000000E+00 | 0.000000E+00 | -3.667650E-02 | -1.120897E-02 | 1.034885E-02 |
| 55 | 0.000000E+00 | 0.000000E+00 | -3.007008E-02 | -5.319462E-04 | 6.549620E-03 |
| 56 | 0.000000E+00 | 0.000000E+00 | -5.667753E-03 | 8.924698E-04 | 4.569043E-05 |
| Surface | $a_{10}$ | $a_{12}$ | | | |
| 15 | -8.759915E-08 | 2.035106E-07 | | | |
| 16 | -3.610175E-06 | -4.508832E-07 | | | |
| 25 | -1.731350E-04 | 1.381439E-05 | | | |
| 26 | 8.202135E-04 | -7.513456E-04 | | | |
| 35 | 6.287177E-04 | -7.161656E-04 | | | |
| 36 | -1.855001E-03 | 5.433515E-04 | | | |
| 45 | -1.059506E-02 | 3.233413E-03 | | | |
| 46 | -2.019918E-03 | 1.004394E-04 | | | |
| 55 | -2.470045E-03 | 2.535871E-04 | | | |
| 56 | 4.699129E-05 | -2.362627E-05 | | | |

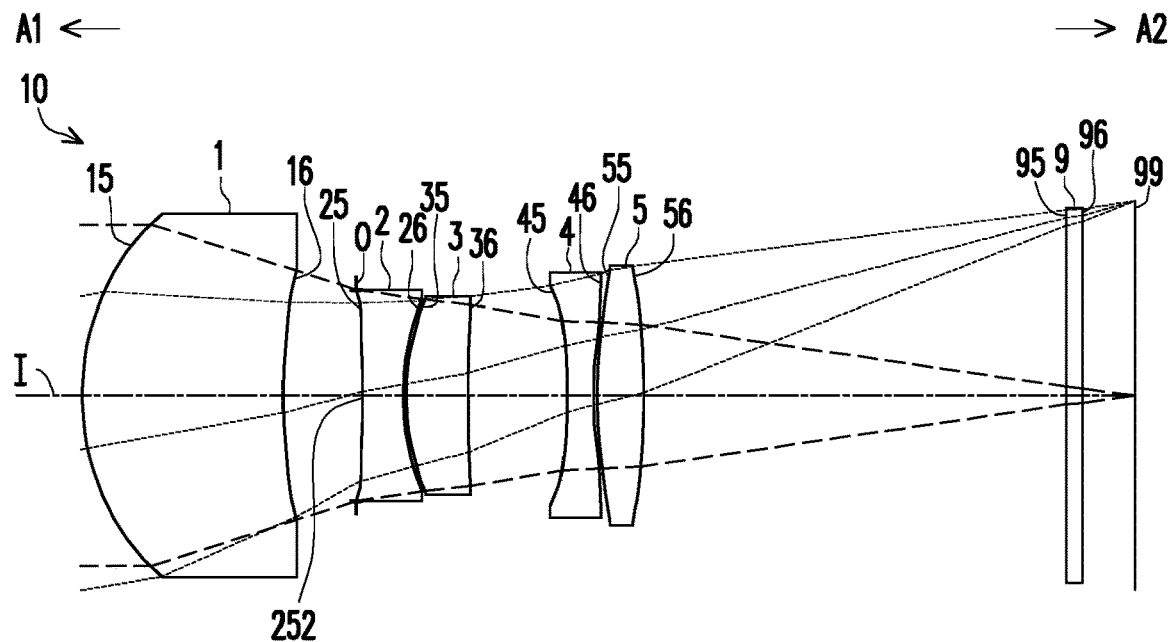
FIG. 34
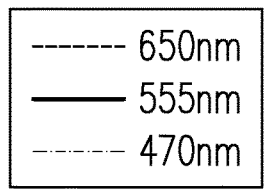
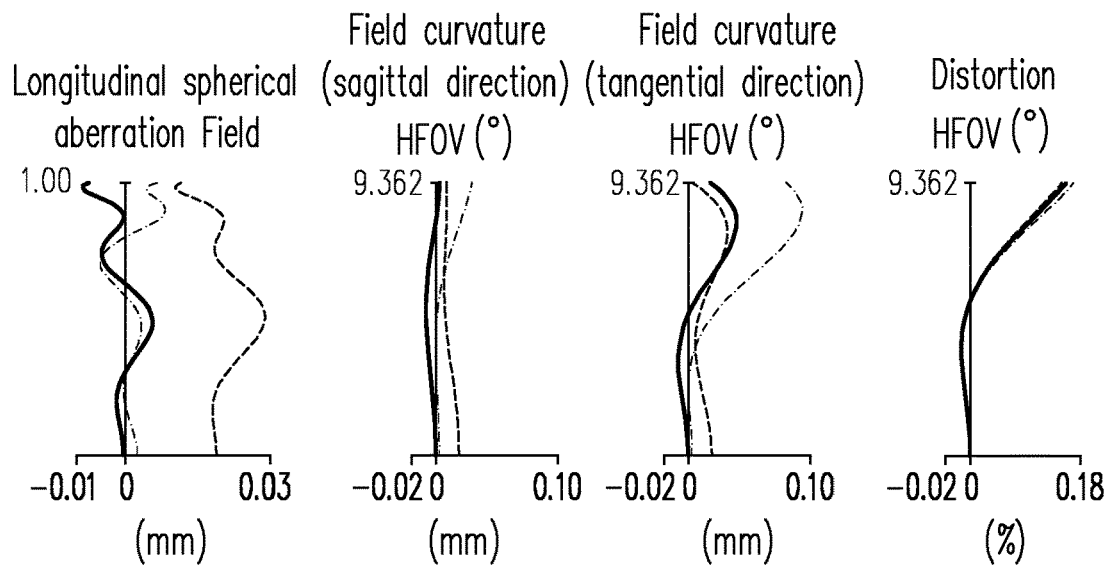
FIG. 35A   FIG. 35B   FIG. 35C   FIG. 35D

| Eighth Embodiment ||||||
| --- | --- | --- | --- | --- | --- |
| Effective focal length(EFL)=15.147 mm, Half field of view(HFOV) =9.362°,System length(TTL)= 13.501 mm, F-number(Fno)=3.347, Image height(ImgH) =2.502 mm ||||||
| Element | Surface | Radius (mm) | Thickness (mm) | Refractive index | Abbe number | Focal length (mm) |
| Object | | | Infinity | | | |
| First lens element 1 | Object-side surface 15 | 3.227 | 2.577 | 1.545 | 55.987 | 8.145 |
| | Image-side surface 16 | 8.436 | 0.931 | | | |
| Aperture 0 | | Infinity | 0.086 | | | |
| Second lens element 2 | Object-side surface 25 | -17.455 | 0.520 | 1.642 | 22.409 | -3.823 |
| | Image-side surface 26 | 2.917 | 0.040 | | | |
| Third lens element 3 | Object-side surface 35 | 3.055 | 0.797 | 1.545 | 55.987 | 6.211 |
| | Image-side surface 36 | 27.846 | 1.270 | | | |
| Fourth lens element 4 | Object-side surface 45 | -9.265 | 0.338 | 1.545 | 55.987 | -5.683 |
| | Image-side surface 46 | 4.729 | 0.040 | | | |
| Fifth lens element 5 | Object-side surface 55 | 4.662 | 0.602 | 1.642 | 22.409 | 5.744 |
| | Image-side surface 56 | -17.428 | 5.420 | | | |
| Filter 9 | Object-side surface 95 | Infinity | 0.210 | 1.517 | 64.167 | |
| | Image-side surface 96 | Infinity | 0.669 | | | |
| | Image plane 99 | Infinity | | | | |

FIG. 36

| Surface | K | $a_2$ | $a_4$ | $a_6$ | $a_8$ |
|---|---|---|---|---|---|
| 15 | 0.000000E+00 | 0.000000E+00 | -2.103010E-04 | 1.170211E-04 | -9.974665E-06 |
| 16 | 0.000000E+00 | 0.000000E+00 | 2.044068E-03 | 5.690269E-05 | -5.549949E-05 |
| 25 | 0.000000E+00 | 0.000000E+00 | -1.030641E-02 | -9.705900E-05 | 1.446878E-03 |
| 26 | 0.000000E+00 | 0.000000E+00 | -2.800881E-02 | 7.883169E-03 | -2.415878E-03 |
| 35 | 0.000000E+00 | 0.000000E+00 | -1.708240E-02 | 8.159340E-03 | -1.224231E-03 |
| 36 | 0.000000E+00 | 0.000000E+00 | 3.914949E-03 | 4.741742E-03 | -2.037295E-03 |
| 45 | 0.000000E+00 | 0.000000E+00 | -8.974342E-03 | -1.235946E-02 | 3.232927E-03 |
| 46 | 0.000000E+00 | 0.000000E+00 | -2.873642E-02 | -1.161053E-02 | 8.793568E-03 |
| 55 | 0.000000E+00 | 0.000000E+00 | -3.501874E-02 | -1.084092E-03 | 7.113893E-03 |
| 56 | 0.000000E+00 | 0.000000E+00 | -1.656321E-02 | 2.977546E-03 | -7.867788E-04 |
| Surface | $a_{10}$ | $a_{12}$ | | | |
| 15 | -1.209721E-06 | 4.537600E-07 | | | |
| 16 | 5.714288E-05 | -3.054497E-06 | | | |
| 25 | 3.621236E-05 | -1.112510E-04 | | | |
| 26 | 4.203476E-03 | -1.305460E-03 | | | |
| 35 | 8.223359E-04 | -3.556318E-04 | | | |
| 36 | -1.946115E-03 | 7.222932E-04 | | | |
| 45 | -2.360675E-03 | 8.117008E-04 | | | |
| 46 | -2.262231E-03 | 2.531612E-04 | | | |
| 55 | -1.999082E-03 | 1.344276E-04 | | | |
| 56 | 7.073509E-04 | -1.583373E-04 | | | |

FIG. 37

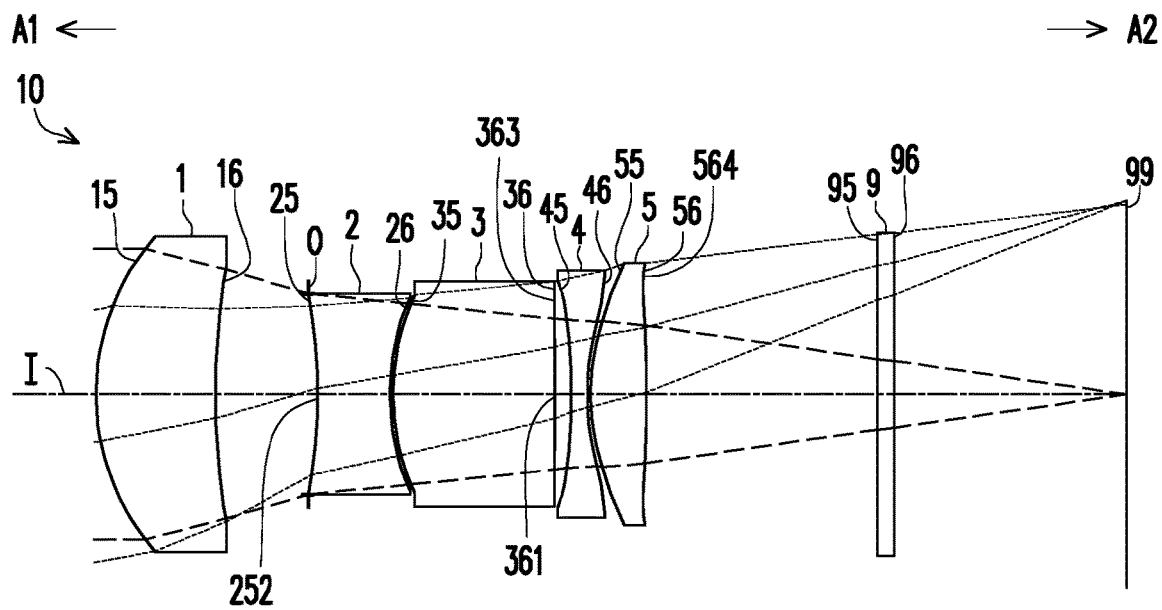
FIG. 38
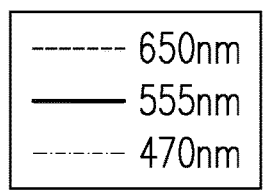
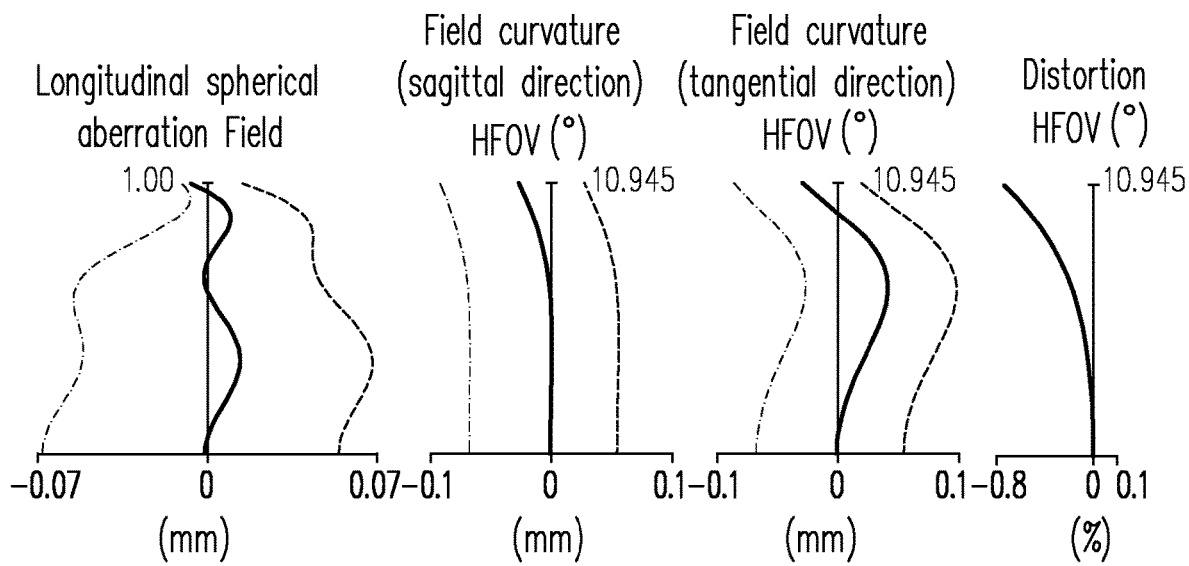
FIG. 39A  FIG. 39B  FIG. 39C  FIG. 39D

| Ninth Embodiment |||||||
|---|---|---|---|---|---|---|
| Effective focal length(EFL)=13.032 mm, Half field of view(HFOV) =10.945°,System length(TTL)= 13.332 mm, F-number(Fno)=3.345, Image height(ImgH) =2.502 mm |||||||
| Element | Surface | Radius (mm) | Thickness (mm) | Refractive index | Abbe number | Focal length (mm) |
| Object | | | Infinity | | | |
| First lens element 1 | Object-side surface 15 | 3.098 | 1.539 | 1.545 | 55.987 | 7.820 |
| | Image-side surface 16 | 9.298 | 1.187 | | | |
| Aperture 0 | | Infinity | 0.144 | | | |
| Second lens element 2 | Object-side surface 25 | -6.564 | 0.938 | 1.642 | 22.409 | -3.082 |
| | Image-side surface 26 | 3.027 | 0.040 | | | |
| Third lens element 3 | Object-side surface 35 | 2.857 | 2.086 | 1.642 | 22.409 | 4.113 |
| | Image-side surface 36 | -27.917 | 0.215 | | | |
| Fourth lens element 4 | Object-side surface 45 | -10.197 | 0.209 | 1.545 | 55.987 | -4.154 |
| | Image-side surface 46 | 2.940 | 0.040 | | | |
| Fifth lens element 5 | Object-side surface 55 | 2.477 | 0.720 | 1.545 | 55.987 | 4.449 |
| | Image-side surface 56 | -116.983 | 3.000 | | | |
| Filter 9 | Object-side surface 95 | Infinity | 0.210 | 1.517 | 64.167 | |
| | Image-side surface 96 | Infinity | 3.004 | | | |
| | Image plane 99 | Infinity | | | | |

FIG. 40

| Surface | K | $a_2$ | $a_4$ | $a_6$ | $a_8$ |
|---|---|---|---|---|---|
| 15 | 0.000000E+00 | 0.000000E+00 | 7.815357E-05 | -2.547994E-05 | -5.583847E-05 |
| 16 | 0.000000E+00 | 0.000000E+00 | 2.990246E-04 | -1.062737E-03 | 2.193816E-04 |
| 25 | 0.000000E+00 | 0.000000E+00 | -2.819998E-03 | 1.599208E-03 | 1.239806E-03 |
| 26 | 0.000000E+00 | 0.000000E+00 | -2.151426E-02 | 6.232642E-03 | 2.280470E-03 |
| 35 | 0.000000E+00 | 0.000000E+00 | -1.818901E-02 | 2.890927E-03 | 8.826492E-04 |
| 36 | 0.000000E+00 | 0.000000E+00 | 5.549464E-04 | 1.049406E-02 | 1.199589E-03 |
| 45 | 0.000000E+00 | 0.000000E+00 | -1.670679E-02 | 5.657040E-03 | 1.317230E-03 |
| 46 | 0.000000E+00 | 0.000000E+00 | -2.534406E-02 | -1.661884E-02 | 8.336247E-03 |
| 55 | 0.000000E+00 | 0.000000E+00 | -3.722621E-02 | -6.481934E-03 | 7.470323E-03 |
| 56 | 0.000000E+00 | 0.000000E+00 | -1.454662E-02 | 2.677465E-03 | -7.061307E-04 |
| Surface | $a_{10}$ | $a_{12}$ | | | |
| 15 | 2.278944E-06 | 3.166029E-06 | | | |
| 16 | 2.953563E-05 | 6.186190E-06 | | | |
| 25 | -1.369386E-04 | -2.320467E-05 | | | |
| 26 | 4.818453E-04 | -5.302433E-04 | | | |
| 35 | 6.350940E-04 | -5.948000E-04 | | | |
| 36 | -3.457742E-03 | 5.737141E-04 | | | |
| 45 | -3.290324E-03 | 7.489719E-04 | | | |
| 46 | -1.872757E-03 | 1.676850E-04 | | | |
| 55 | -1.541714E-03 | 4.716175E-05 | | | |
| 56 | 1.351177E-03 | -2.830837E-04 | | | |

FIG. 41

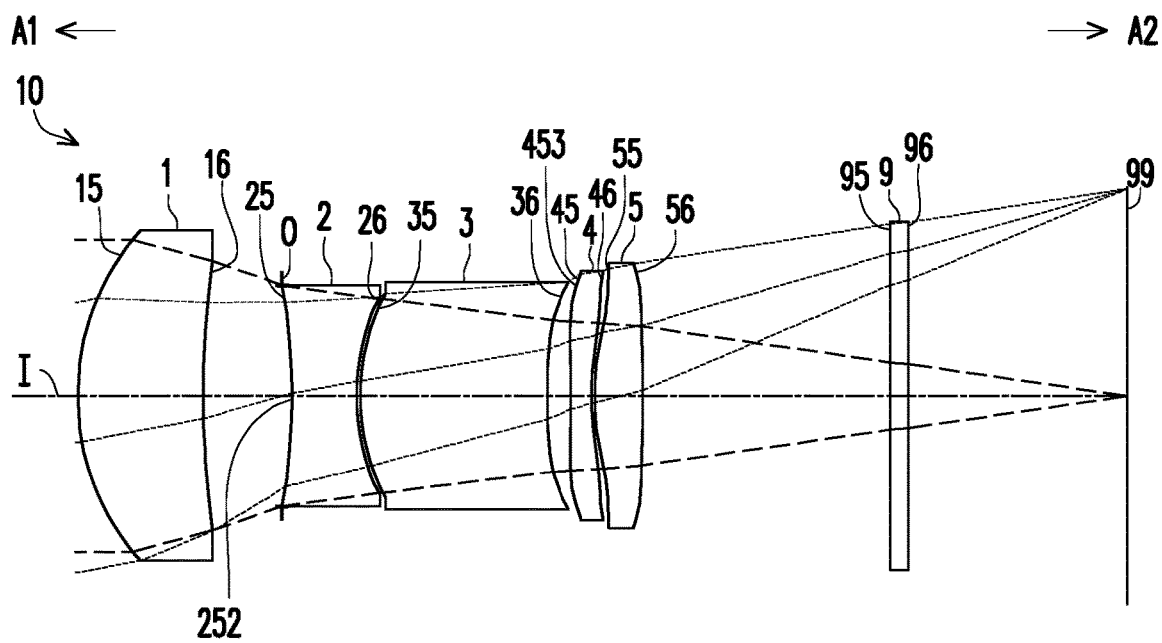
FIG. 42
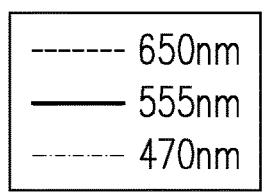
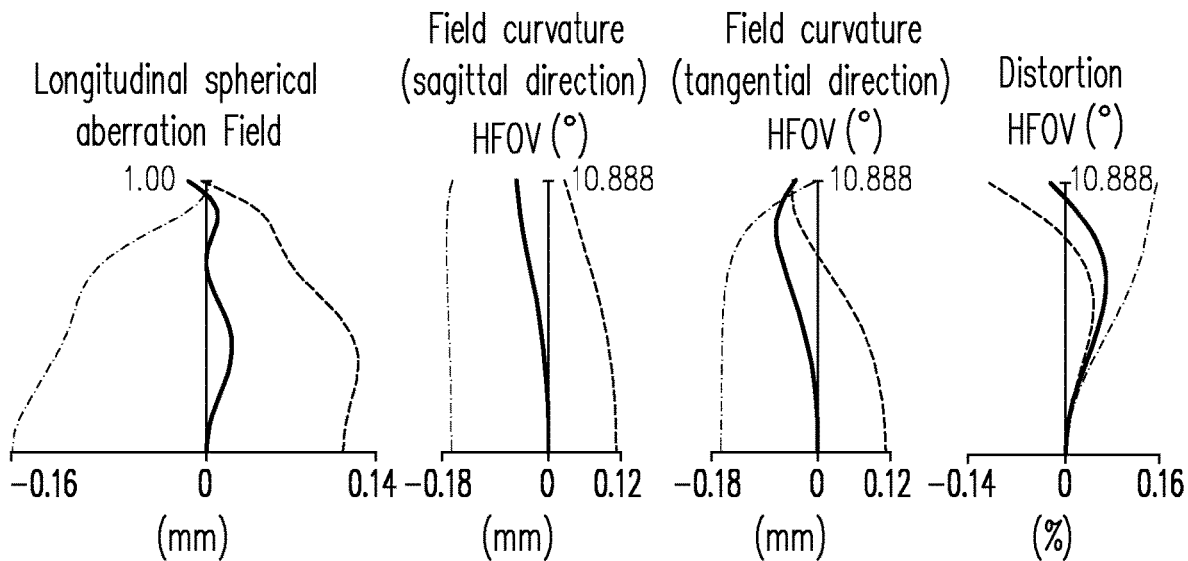
FIG. 43A  FIG. 43B  FIG. 43C  FIG. 43D

| Tenth Embodiment | | | | | | |
|---|---|---|---|---|---|---|
| Effective focal length(EFL)=13.008 mm, Half field of view(HFOV) =10.888°, System length(TTL)= 12.652 mm, F-number(Fno)=3.343, Image height(ImgH) =2.502 mm | | | | | | |
| Element | Surface | Radius (mm) | Thickness (mm) | Refractive index | Abbe number | Focal length (mm) |
| Object | | | Infinity | | | |
| First lens element 1 | Object-side surface 15 | 2.968 | 1.513 | 1.545 | 55.987 | 6.997 |
| | Image-side surface 16 | 10.880 | 0.935 | | | |
| Aperture 0 | | Infinity | 0.135 | | | |
| Second lens element 2 | Object-side surface 25 | -7.992 | 0.785 | 1.642 | 22.409 | -2.926 |
| | Image-side surface 26 | 2.578 | 0.040 | | | |
| Third lens element 3 | Object-side surface 35 | 2.451 | 2.251 | 1.642 | 22.409 | 4.679 |
| | Image-side surface 36 | 8.215 | 0.292 | | | |
| Fourth lens element 4 | Object-side surface 45 | -23.383 | 0.248 | 1.545 | 55.987 | -5.269 |
| | Image-side surface 46 | 3.295 | 0.040 | | | |
| Fifth lens element 5 | Object-side surface 55 | 2.846 | 0.571 | 1.642 | 22.409 | 4.397 |
| | Image-side surface 56 | -325511759760.681 | 3.000 | | | |
| Filter 9 | Object-side surface 95 | Infinity | 0.210 | 1.517 | 64.167 | |
| | Image-side surface 96 | Infinity | 2.631 | | | |
| | Image plane 99 | Infinity | | | | |

FIG. 44

| Surface | K | $a_2$ | $a_4$ | $a_6$ | $a_8$ |
|---|---|---|---|---|---|
| 15 | 0.000000E+00 | 0.000000E+00 | 2.311334E-04 | -1.194309E-04 | -5.731016E-05 |
| 16 | 0.000000E+00 | 0.000000E+00 | -8.687498E-04 | -1.363347E-03 | 1.801935E-04 |
| 25 | 0.000000E+00 | 0.000000E+00 | -7.516256E-03 | 1.675241E-03 | 1.618756E-03 |
| 26 | 0.000000E+00 | 0.000000E+00 | -2.435882E-02 | 4.801948E-03 | 3.281756E-03 |
| 35 | 0.000000E+00 | 0.000000E+00 | -1.998193E-02 | 1.993536E-03 | 1.474326E-03 |
| 36 | 0.000000E+00 | 0.000000E+00 | 2.928399E-02 | 1.786667E-02 | -4.032869E-03 |
| 45 | 0.000000E+00 | 0.000000E+00 | 1.483231E-02 | 1.147937E-02 | 2.918938E-03 |
| 46 | 0.000000E+00 | 0.000000E+00 | -4.441521E-02 | -1.926493E-02 | 9.422565E-03 |
| 55 | 0.000000E+00 | 0.000000E+00 | -4.294930E-02 | -1.104535E-02 | 1.453067E-03 |
| 56 | 0.000000E+00 | 0.000000E+00 | -8.089059E-03 | 2.804728E-04 | -2.280978E-03 |
| Surface | $a_{10}$ | $a_{12}$ | | | |
| 15 | -1.829862E-06 | 2.299139E-06 | | | |
| 16 | 3.212829E-05 | 9.688812E-07 | | | |
| 25 | -2.565043E-04 | -1.624009E-05 | | | |
| 26 | 1.990683E-03 | -5.706358E-04 | | | |
| 35 | 7.048280E-04 | -1.894669E-04 | | | |
| 36 | -1.537742E-03 | 2.869488E-04 | | | |
| 45 | -3.062556E-03 | 6.675833E-04 | | | |
| 46 | -2.355089E-03 | 9.423432E-04 | | | |
| 55 | -6.107586E-05 | 3.698774E-04 | | | |
| 56 | 2.079805E-04 | 8.129243E-05 | | | |

FIG. 45

| Condition | First Embodiment | Second Embodiment | Third Embodiment | Fouth Embodiment | Fifth Embodiment |
|---|---|---|---|---|---|
| T1 | 1.636 | 2.334 | 4.734 | 1.576 | 1.515 |
| G12 | 1.577 | 0.572 | 2.007 | 1.847 | 1.772 |
| T2 | 0.396 | 0.507 | 0.720 | 0.240 | 0.550 |
| G23 | 0.040 | 0.040 | 0.040 | 0.040 | 0.040 |
| T3 | 1.155 | 0.766 | 1.069 | 1.461 | 1.151 |
| G34 | 0.374 | 0.554 | 1.193 | 0.591 | 0.766 |
| T4 | 0.408 | 0.345 | 1.932 | 0.460 | 0.240 |
| G45 | 0.040 | 0.040 | 0.040 | 0.040 | 0.040 |
| T5 | 0.637 | 0.586 | 0.802 | 0.654 | 1.032 |
| G5F | 5.420 | 5.420 | 5.420 | 5.420 | 5.420 |
| TF | 0.210 | 0.210 | 0.210 | 0.210 | 0.210 |
| GFP | 0.787 | 0.669 | 0.669 | 0.152 | 0.355 |
| V1 | 55.987 | 55.987 | 55.987 | 55.987 | 55.987 |
| V2 | 20.373 | 22.409 | 22.409 | 22.409 | 22.409 |
| V3 | 55.987 | 55.987 | 55.987 | 55.987 | 55.987 |
| V4 | 55.987 | 55.987 | 55.987 | 55.987 | 55.987 |
| V5 | 22.409 | 22.409 | 22.409 | 22.409 | 22.409 |
| ALT | 4.233 | 4.538 | 9.257 | 4.390 | 4.488 |
| TL | 6.264 | 5.744 | 12.537 | 6.908 | 7.106 |
| AAG | 2.031 | 1.206 | 3.280 | 2.518 | 2.618 |
| EFL | 14.458 | 13.373 | 19.971 | 14.508 | 14.411 |
| BFL | 6.417 | 6.299 | 6.299 | 5.782 | 5.985 |
| TTL | 12.680 | 12.043 | 18.836 | 12.689 | 13.092 |
| $T_{min}$ | 0.396 | 0.345 | 0.720 | 0.240 | 0.240 |
| $T_{max}$ | 1.636 | 2.334 | 4.734 | 1.576 | 1.515 |

FIG. 46

| Condition | First Embodiment | Second Embodiment | Third Embodiment | Fouth Embodiment | Fifth Embodiment |
|---|---|---|---|---|---|
| (T1+T3)/(T2+T4+T5) | 1.937 | 2.156 | 1.680 | 2.245 | 1.463 |
| TTL/(G12+T3) | 4.641 | 9.001 | 6.124 | 3.836 | 4.479 |
| TL/BFL | 0.976 | 0.912 | 1.990 | 1.195 | 1.187 |
| EFL/(T2+G23+T3+G34+T4+G45+T5) | 4.740 | 4.712 | 3.446 | 4.163 | 3.773 |
| TTL/AAG | 6.245 | 9.984 | 5.742 | 5.040 | 5.000 |
| EFL/AAG | 7.121 | 11.087 | 6.088 | 5.762 | 5.504 |
| (T1+T3+T4+T5)/AAG | 1.890 | 3.342 | 2.602 | 1.648 | 1.504 |
| T1/(G34+T4) | 2.093 | 2.595 | 1.515 | 1.500 | 1.505 |
| T3/(T2+T5) | 1.119 | 0.701 | 0.702 | 1.636 | 0.728 |
| ALT/G12 | 2.684 | 7.934 | 4.612 | 2.377 | 2.533 |
| EFL/(T1+T3+T5) | 4.217 | 3.628 | 3.024 | 3.931 | 3.897 |
| TL/(T1+G12) | 1.949 | 1.977 | 1.860 | 2.018 | 2.162 |
| TTL/(G23+G34+G45) | 27.960 | 18.988 | 14.791 | 18.917 | 15.466 |
| (T2+T3)/(G23+G34) | 3.751 | 2.142 | 1.450 | 2.697 | 2.109 |
| BFL/(G12+G23+G45) | 3.872 | 9.660 | 3.018 | 3.000 | 3.232 |
| (T1+G12)/(T4+G45+T5) | 2.960 | 2.992 | 2.430 | 2.968 | 2.505 |
| (T1+G12)/(T2+T4) | 3.995 | 3.411 | 2.542 | 4.894 | 4.161 |

FIG. 47

| Condition | Sixth Embodiment | Seventh Embodiment | Eighth Embodiment | Ninth Embodiment | Tenth Embodiment |
|---|---|---|---|---|---|
| T1 | 2.242 | 1.515 | 2.577 | 1.539 | 1.513 |
| G12 | 0.497 | 1.323 | 1.018 | 1.331 | 1.070 |
| T2 | 0.580 | 0.852 | 0.520 | 0.938 | 0.785 |
| G23 | 0.040 | 0.040 | 0.040 | 0.040 | 0.040 |
| T3 | 1.118 | 1.717 | 0.797 | 2.085 | 2.251 |
| G34 | 0.272 | 0.323 | 1.270 | 0.215 | 0.292 |
| T4 | 0.339 | 0.259 | 0.338 | 0.209 | 0.248 |
| G45 | 0.040 | 0.040 | 0.040 | 0.040 | 0.040 |
| T5 | 0.694 | 1.592 | 0.602 | 0.720 | 0.571 |
| G5F | 5.420 | 5.000 | 5.420 | 3.000 | 3.000 |
| TF | 0.210 | 0.210 | 0.210 | 0.210 | 0.210 |
| GFP | 0.669 | 0.304 | 0.669 | 3.004 | 2.631 |
| V1 | 55.987 | 55.987 | 55.987 | 55.987 | 55.987 |
| V2 | 22.409 | 22.409 | 22.409 | 22.409 | 22.409 |
| V3 | 55.987 | 55.987 | 55.987 | 22.409 | 22.409 |
| V4 | 55.987 | 55.987 | 55.987 | 55.987 | 55.987 |
| V5 | 22.409 | 22.409 | 22.409 | 55.987 | 22.409 |
| ALT | 4.974 | 5.934 | 4.835 | 5.491 | 5.369 |
| TL | 5.823 | 7.660 | 7.202 | 7.117 | 6.811 |
| AAG | 0.849 | 1.726 | 2.368 | 1.626 | 1.442 |
| EFL | 13.121 | 14.471 | 15.147 | 13.032 | 13.008 |
| BFL | 6.299 | 5.514 | 6.299 | 6.214 | 5.841 |
| TTL | 12.122 | 13.174 | 13.501 | 13.332 | 12.652 |
| $T_{min}$ | 0.339 | 0.259 | 0.338 | 0.209 | 0.248 |
| $T_{max}$ | 2.242 | 1.717 | 2.577 | 2.085 | 2.251 |

FIG. 48

| Condition | Sixth Embodiment | Seventh Embodiment | Eighth Embodiment | Ninth Embodiment | Tenth Embodiment |
|---|---|---|---|---|---|
| (T1+T3)/(T2+T4+T5) | 2.082 | 1.195 | 2.310 | 1.941 | 2.347 |
| TTL/(G12+T3) | 7.506 | 4.334 | 7.439 | 3.903 | 3.809 |
| TL/BFL | 0.925 | 1.389 | 1.143 | 1.145 | 1.166 |
| EFL/(T2+G23+T3+G34+T4+G45+T5) | 4.255 | 3.000 | 4.199 | 3.068 | 3.077 |
| TTL/AAG | 14.271 | 7.633 | 5.702 | 8.199 | 8.774 |
| EFL/AAG | 15.447 | 8.384 | 6.397 | 8.015 | 9.021 |
| (T1+T3+T4+T5)/AAG | 5.172 | 2.945 | 1.822 | 2.800 | 3.179 |
| T1/(G34+T4) | 3.665 | 2.602 | 1.603 | 3.623 | 2.801 |
| T3/(T2+T5) | 0.877 | 0.702 | 0.710 | 1.258 | 1.661 |
| ALT/G12 | 10.008 | 4.486 | 4.749 | 4.127 | 5.018 |
| EFL/(T1+T3+T5) | 3.237 | 3.000 | 3.809 | 3.000 | 3.000 |
| TL/(T1+G12) | 2.126 | 2.700 | 2.003 | 2.481 | 2.636 |
| TTL/(G23+G34+G45) | 34.395 | 32.687 | 10.002 | 45.128 | 34.019 |
| (T2+T3)/(G23+G34) | 5.436 | 7.075 | 1.006 | 11.839 | 9.148 |
| BFL/(G12+G23+G45) | 10.916 | 3.930 | 5.736 | 4.406 | 5.079 |
| (T1+G12)/(T4+G45+T5) | 2.552 | 1.500 | 3.668 | 2.961 | 3.007 |
| (T1+G12)/(T2+T4) | 2.978 | 2.554 | 4.190 | 2.500 | 2.500 |

FIG. 49

OPTICAL IMAGING LENS

CROSS-REFERENCE TO RELATED APPLICATION

This application claims the priority benefit of China application serial no. 201910175630.5, filed on Mar. 8, 2019. The entirety of the above-mentioned patent application is hereby incorporated by reference herein and made a part of this specification.

BACKGROUND

Technical Field

The disclosure relates to an optical device, and particularly relates to an optical imaging lens.

Description of Related Art

In recent years, optical imaging lenses are being developed progressively, and the demanded scope of application has become much broader. The application of optical imaging lenses is not limited to capturing images and recording videos but also copes with the needs for telephotography and provides an optical zooming function through use with a wide-angle lens. The longer the system focal length of a telephoto lens, the greater the magnification of optical zooming becomes.

However, as the focal length of the optical imaging lens increases, the system length also increases accordingly. The increase in distance between lenses results in a less favorable assemblability and a lower manufacturing yield. Therefore, how to maintain the imaging quality and increase the assembability and the manufacturing yield while increasing the system focal length of the optical imaging lens has become an issue to work on.

SUMMARY

The disclosure provides an optical imaging lens having more desirable optical parameters and favorable imaging quality.

An embodiment of the disclosure provides an optical imaging lens. The optical imaging includes a first lens element, a second lens element, a third lens element, a fourth lens element, and a fifth lens element arranged in sequence from an object side to an image side along an optical axis. Each of the first lens element to the fifth lens element includes an object-side surface facing the object side and allowing an imaging ray to pass through and an image-side surface facing the image side and allowing the imaging ray to pass through. Only the first lens element to the fifth lens element have refracting power among lens elements of the optical imaging lens. A periphery region of the image-side surface of the first lens element is concave. An optical axis region of the image-side surface of the second lens element is concave. A periphery region of the image-side surface of the fourth lens element is concave. A periphery region of the object-side surface of the fifth lens element is convex and an optical axis region of the image-side surface of the fifth lens element is convex. Twice of an Abbe number of the fourth lens element is greater than a sum of an Abbe number of the second lens element, an Abbe number of the third lens element, and an Abbe number of the fifth lens element.

An embodiment of the disclosure provides an optical imaging lens. The optical imaging includes a first lens element, a second lens element, a third lens element, a fourth lens element, and a fifth lens element arranged in sequence from an object side to an image side along an optical axis. Each of the first lens element to the fifth lens element includes an object-side surface facing the object side and allowing an imaging ray to pass through and an image-side surface facing the image side and allowing the imaging ray to pass through. Only the first lens element to the fifth lens element have refracting power among lens elements of the optical imaging lens. A periphery region of the image-side surface of the first lens element is concave. The fourth lens element has negative refracting power, and a periphery region of the image-side surface of the fourth lens element is concave. A periphery region of the object-side surface of the fifth lens element is convex and an optical axis region of the image-side surface of the fifth lens element is convex. Twice of an Abbe number of the fourth lens element is greater than a sum of an Abbe number of the second lens element, an Abbe number of the third lens element, and an Abbe number of the fifth lens element.

An embodiment of the disclosure provides an optical imaging lens. The optical imaging includes a first lens element, a second lens element, a third lens element, a fourth lens element, and a fifth lens element arranged in sequence from an object side to an image side along an optical axis. Each of the first lens element to the fifth lens element includes an object-side surface facing the object side and allowing an imaging ray to pass through and an image-side surface facing the image side and allowing the imaging ray to pass through. Only the first lens element to the fifth lens element have refracting power among lens elements of the optical imaging lens. A periphery region of the image-side surface of the first lens element is concave. An optical axis region of the image-side surface of the fourth lens element is concave, and a periphery region of the image-side surface of the fourth lens element is concave. A periphery region of the object-side surface of the fifth lens element is convex and an optical axis region of the image-side surface of the fifth lens element is convex. Twice of an Abbe number of the fourth lens element is greater than a sum of an Abbe number of the second lens element, an Abbe number of the third lens element, and an Abbe number of the fifth lens element.

Based on the above, the optical imaging lens according to the embodiments of the disclosure renders the following beneficial effect. That is, by satisfying the design of the arrangement of the concave/convex curved surfaces of the lens elements, the condition on refracting power, and the design of the above condition, the optical imaging lens not only has a greater system focal length but is also able to maintain favorable imaging quality and increase the assemblability and the manufacturing yield.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6 is a schematic diagram illustrating an optical imaging lens according to a first embodiment of the disclosure.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the disclosure.

FIG. 10 is a schematic diagram illustrating an optical imaging lens according to a second embodiment of the disclosure.

FIGS. 11A to 11D are diagrams illustrating a longitudinal spherical aberration and various aberrations of the optical imaging lens according to the second embodiment.

FIG. 12 shows detailed optical data of the optical imaging lens according to the second embodiment of the disclosure.

FIG. 13 shows aspheric parameters pertaining to the optical imaging lens according to the second embodiment of the disclosure.

FIG. 14 is a schematic diagram illustrating an optical imaging lens according to a third embodiment of the disclosure.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the disclosure.

FIG. 17 shows aspheric parameters pertaining to the optical imaging lens according to the third embodiment of the disclosure.

FIG. 18 is a schematic diagram illustrating an optical imaging lens according to a fourth embodiment of the disclosure.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the disclosure.

FIG. 21 shows aspheric parameters pertaining to the optical imaging lens according to the fourth embodiment of the disclosure.

FIG. 22 is a schematic diagram illustrating an optical imaging lens according to a fifth embodiment of the disclosure.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the disclosure.

FIG. 25 shows aspheric parameters pertaining to the optical imaging lens according to the fifth embodiment of the disclosure.

FIG. 26 is a schematic diagram illustrating an optical imaging lens according to a sixth embodiment of the disclosure.

FIGS. 27A to 27D are diagrams illustrating a longitudinal spherical aberration and various aberrations of the optical imaging lens according to the sixth embodiment.

FIG. 28 shows detailed optical data of the optical imaging lens according to the sixth embodiment of the disclosure.

FIG. 29 shows aspheric parameters pertaining to the optical imaging lens according to the sixth embodiment of the disclosure.

FIG. 30 is a schematic diagram illustrating an optical imaging lens according to a seventh embodiment of the disclosure.

FIGS. 31A to 31D are diagrams illustrating a longitudinal spherical aberration and various aberrations of the optical imaging lens according to the seventh embodiment.

FIG. 32 shows detailed optical data of the optical imaging lens according to the seventh embodiment of the disclosure.

FIG. 34 is a schematic diagram illustrating an optical imaging lens according to an eighth embodiment of the disclosure.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the disclosure.

FIG. 37 shows aspheric parameters pertaining to the optical imaging lens according to the eighth embodiment of the disclosure.

FIG. 38 is a schematic diagram illustrating an optical imaging lens according to a ninth embodiment of the disclosure.

FIGS. 39A to 39D are diagrams illustrating a longitudinal spherical aberration and various aberrations of the optical imaging lens according to the ninth embodiment.

FIG. 40 shows detailed optical data of the optical imaging lens according to the ninth embodiment of the disclosure.

FIG. 41 shows aspheric parameters pertaining to the optical imaging lens according to the ninth embodiment of the disclosure.

FIG. 42 is a schematic diagram illustrating an optical imaging lens according to a tenth embodiment of the disclosure.

FIGS. 43A to 43D are diagrams illustrating a longitudinal spherical aberration and various aberrations of the optical imaging lens according to the tenth embodiment.

FIG. 44 shows detailed optical data of the optical imaging lens according to the tenth embodiment of the disclosure.

FIG. 45 shows aspheric parameters pertaining to the optical imaging lens according to the tenth embodiment of the disclosure.

FIGS. 46 and 47 show values of respective important parameters and relations thereof of the optical imaging lenses according to the first through fifth embodiments of the disclosure.

FIGS. 48 and 49 show values of respective important parameters and relations thereof of the optical imaging lenses according to the sixth through tenth embodiments of the disclosure.

DESCRIPTION OF THE EMBODIMENTS

Figure 1:
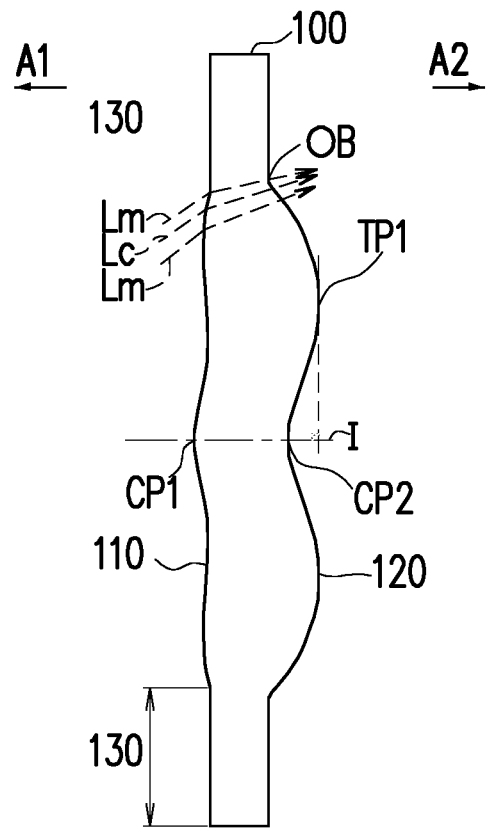
FIG. 1 is a schematic diagram illustrating a surface shape structure of a lens.

Reference will now be made in detail to the present preferred embodiments of the disclosure, examples of which are illustrated in the accompanying drawings. Wherever possible, the same reference numbers are used in the drawings and the description to refer to the same or like parts.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
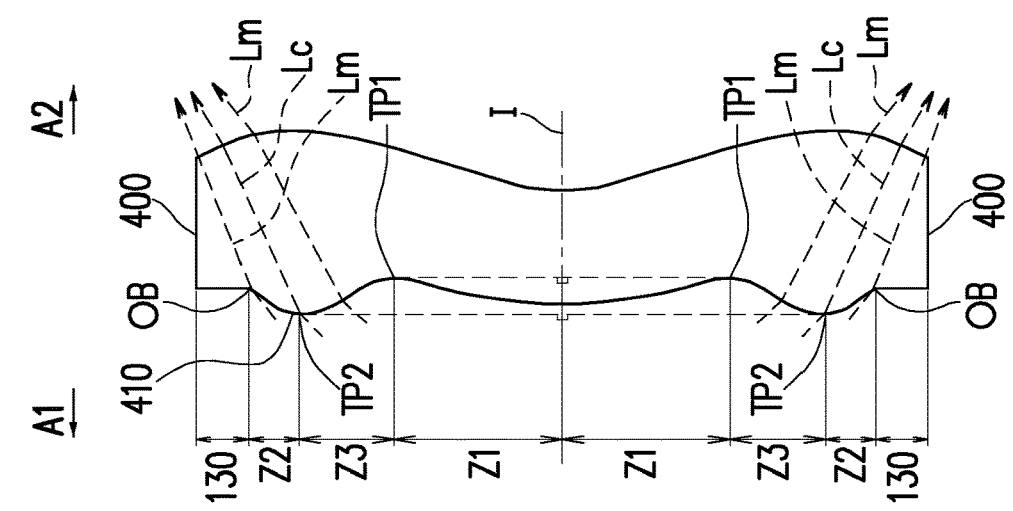
FIG. 4 is a schematic diagram illustrating a surface shape structure of a lens according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest $N^{th}$ transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
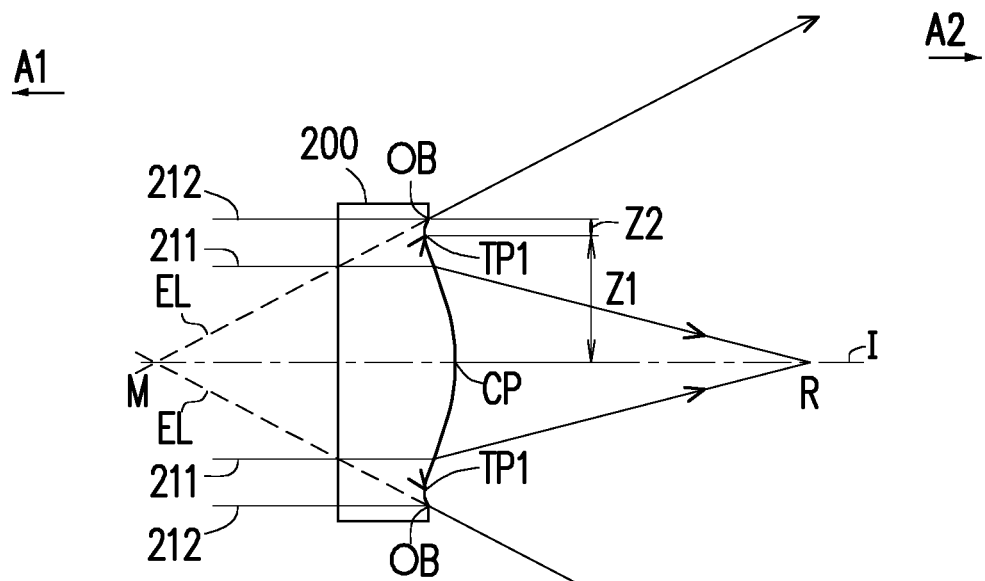
FIG. 2 is a schematic diagram illustrating surface shape concave and convex structures and a light focal point of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
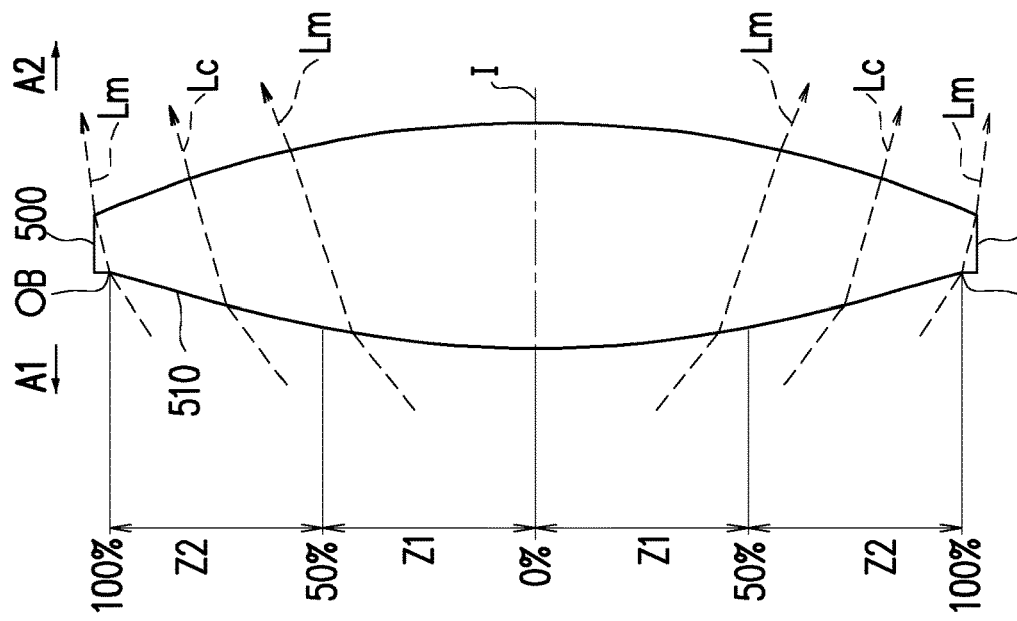
FIG. 5 is a schematic diagram illustrating a surface shape structure of a lens according to Example 3.
Figure 3:
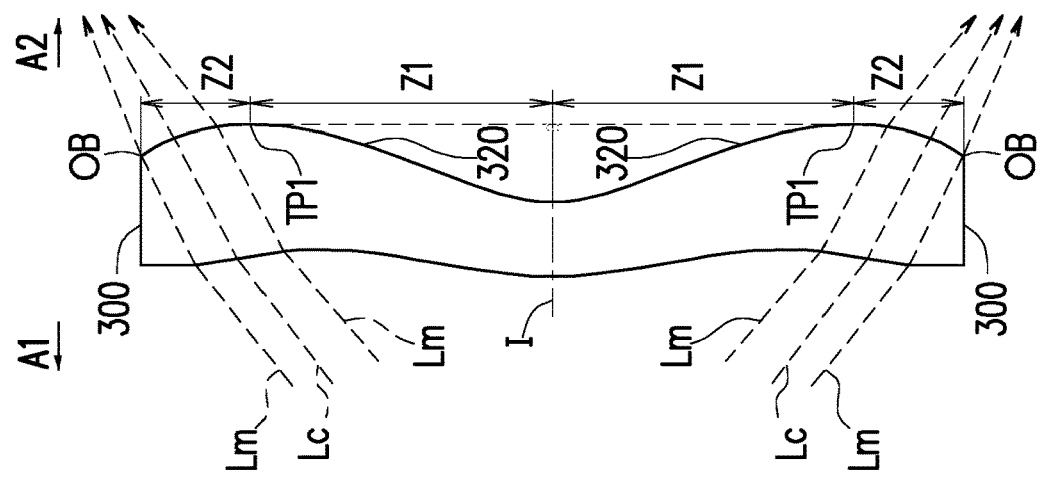
FIG. 3 is a schematic diagram illustrating a surface shape structure of a lens according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the disclosure, and FIGS. 7A to 7D are diagrams illustrating a longitudinal spherical aberration and various aberrations of the optical imaging lens according to the first embodiment. Referring to FIG. 6, an optical imaging lens 10 of the first embodiment of the disclosure includes a first lens element 1, an aperture 0, a second lens element 2, a third lens element 3, a fourth lens element 4, a fifth lens element 5, and a filter 9 (e.g., an IR cut filter) arranged in sequence from an object side A1 to an image side A2 along an optical axis I of the optical imaging lens 10. When rays emitted from an object to be shot enter the optical imaging lens 10 and pass in sequence through the first lens element 1, the aperture 0, the second lens element 2, the third lens element 3, the fourth lens element 4, the fifth lens element 5, and the filter 9, an image may be formed on an image plane 99. The filter 9 is disposed between the fifth lens element 5 and the image plane 99. It should be noted that the object side is a side facing the object to be shot, and the image side is a side facing the image plane 99.

In the present embodiment, the first lens element 1, the second lens element 2, the third lens element 3, the fourth lens element 4, the fifth lens element 5, and the filter 9 of the optical imaging lens 10 respectively have object-side surfaces 15, 25, 35, 45, 55, and 95 facing the object side and allowing imaging rays to pass through, and respectively have image-side surfaces 16, 26, 36, 46, 56, and 96 facing the image side and allowing the imaging rays to pass through. In the present embodiment, the aperture 0 is disposed between the first lens element 1 and the second lens element 2.

The first lens element 1 has positive refracting power. The first lens element 1 is made of plastics. An optical axis region 151 of the object-side surface 15 of the first lens element 1 is convex, and its periphery region 153 is convex. An optical axis region 162 of the image-side surface 16 of the first lens element 1 is concave, and its periphery region 164 is concave. In the present embodiment, both the object-side surface 15 and the image-side surface 16 of the first lens element 1 are aspheric. However, the disclosure is not limited thereto.

The second lens element 2 has negative refracting power. The second lens element 2 is made of plastics. An optical axis region 251 of the object-side surface 25 of the second lens element 2 is convex, and its periphery region 254 is concave. An optical axis region 262 of the image-side surface 26 of the second lens element 2 is concave, and its periphery region 264 is concave. In the present embodiment, both the object-side surface 25 and the image-side surface 26 of the second lens element 2 are aspheric. However, the disclosure is not limited thereto.

The third lens element 3 has positive refracting power. The third lens element 3 is made of plastics. An optical axis region 351 of the object-side surface 35 of the third lens element 3 is convex, and its periphery region 353 is convex. An optical axis region 362 of the image-side surface 36 of the third lens element 3 is concave, and its periphery region 364 is concave. In the present embodiment, both the object-side surface 35 and the image-side surface 36 of the third lens element 3 are aspheric. However, the disclosure is not limited thereto.

The fourth lens element 4 has negative refracting power. The fourth lens element 4 is made of plastics. An optical axis region 452 of the object-side surface 45 of the fourth lens element 4 is concave, and its periphery region 454 is concave. An optical axis region 462 of the image-side surface 46 of the fourth lens element 4 is concave, and its periphery region 464 is concave. In the present embodiment, both the object-side surface 45 and the image-side surface 46 of the fourth lens element 4 are aspheric. However, the disclosure is not limited thereto.

The fifth lens element 5 has positive refracting power. The fifth lens element 5 is made of plastics. An optical axis region 551 of the object-side surface 55 of the fifth lens element 5 is convex, and its periphery region 553 is convex. An optical axis region 561 of the image-side surface 56 of the fifth lens element 5 is convex, and its periphery region 563 is convex. In the present embodiment, both the object-side surface 55 and the image-side surface 56 of the fifth lens element 5 are aspheric. However, the disclosure is not limited thereto.

In the present embodiment, only the above five lens elements have refracting power among lens elements of the optical imaging lens 10.

Other detailed optical data of the first embodiment are as shown in FIG. 8. Moreover, in the optical imaging lens 10 of the first embodiment, an effective focal length (EFL) of the whole system is 14.458 millimeters (mm), a half field of view (HFOV) is 9.760°, an F-number (Fno) is 3.340, a system length thereof is 12.680 mm, and an image height is 2.502 mm. The system length refers to a distance from the object-side surface 15 of the first lens element 1 to the image plane 99 along the optical axis I.

In addition, in the present embodiment, a total of ten surfaces, namely the object-side surfaces 15, 25, 35, 45, and 55 and the image-side surfaces 16, 26, 36, 46, and 56, of the first lens element 1, the second lens element 2, the third lens element 3, the fourth lens element 4, and the fifth lens element 5 are all aspheric surfaces. Besides, the object-side surfaces 15, 25, 35, 45, and 55 and the image-side surfaces 16, 26, 36, 46, and 56 are general even aspheric surfaces. These aspheric surfaces are defined by the following formula:

$$Z(Y) = \frac{Y^2}{R} / \left(1 + \sqrt{1 - (1+K)\frac{Y^2}{R^2}}\right) + \sum_{i=1}^{n} a_{2i} \times Y^{2i} \quad (1)$$

Specifically,

Y represents a distance from a point on an aspheric curve to the optical axis I;

Z represents a depth of the aspheric surface (i.e., a perpendicular distance between the point on the aspheric surface that is spaced by the distance Y from the optical axis I and a tangent plane tangent to a vertex of the aspheric surface along the optical axis I);

R represents a radius of curvature of the surface of the lens element in a vicinity of the optical axis I;

K represents a conic constant;

$a_{2i}$: an $2i^{th}$ aspheric coefficient.

Figure 9:
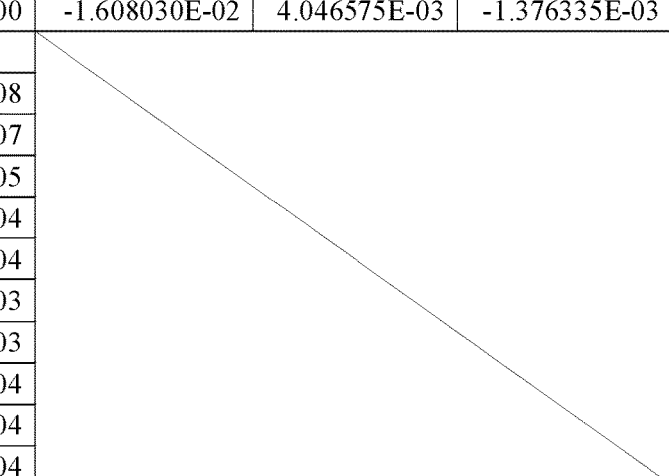
FIG. 9 shows aspheric parameters pertaining to the optical imaging lens according to the first embodiment of the disclosure.

Respective aspheric coefficients from the object-side surface 15 of the first lens element 1 to the image-side surface 56 of the fifth lens element 5 in Formula (1) are as shown in FIG. 9. In FIG. 9, the row of number "15" indicates aspheric coefficients of the object-side surface 15 of the first lens element 1, and the other rows are defined in a similar manner.

In addition, relations of important parameters in the optical imaging lens 10 of the first embodiment are as shown in FIGS. 46 and 47.

Specifically,

EFL represents a system focal length of the optical imaging lens 10;

HFOV represents a half field of view of the optical imaging lens 10;

Fno represents an F-number of the optical imaging lens 10;

T1 represents a thickness of the first lens element 1 along the optical axis I;

T2 represents a thickness of the second lens element 2 along the optical axis I;

T3 represents a thickness of the third lens element 3 along the optical axis I;

T4 represents a thickness of the fourth lens element 4 along the optical axis I;

T5 represents a thickness of the fifth lens element 5 along the optical axis I;

G12 represents a distance from the image-side surface 16 of the first lens element 1 to the object-side surface 25 of the second lens element 2 along the optical axis I, i.e., an air gap between the first lens element 1 and the second lens element 2 along the optical axis I;

G23 represents a distance from the image-side surface 26 of the second lens element 2 to the object-side surface 35 of the third lens element 3 along the optical axis I, i.e., an air gap between the second lens element 2 and the third lens element 3 along the optical axis I;

G34 represents a distance from the image-side surface 36 of the third lens element 3 to the object-side surface 45 of the fourth lens element 4 along the optical axis I, i.e., an air gap between the third lens element 3 and the fourth lens element 4 along the optical axis I;

G45 represents a distance from the image-side surface 46 of the fourth lens element 4 to the object-side surface 55 of the fifth lens element 5 along the optical axis I, i.e., an air gap between the fourth lens element 4 and the fifth lens element 5 along the optical axis I;

G5F represents a distance from the image-side surface 56 of the fifth lens element 5 to the object-side surface 95 of the filter 9 along the optical axis I, i.e., an air gap between the fifth lens element 5 and the filter 9 along the optical axis I;

TF represents a thickness of the filter 9 along the optical axis I;

GFP represents a distance from the image-side surface 95 of the filter 9 to the image plane 99 along the optical axis I, i.e., an air gap between the filter 9 and the image plane 99 along the optical axis I;

TTL represents a distance from the object-side surface 15 of the first lens element 1 to the image plane 99 along the optical axis I;

BFL represents a distance from the image-side surface 56 of the fifth lens element 5 to the image plane 66 along the optical axis I;

AAG represents a sum of the air gaps between the first lens element 1 and the fifth lens element 5 along the optical axis I, i.e., the sum of the four air gaps G12, G23, G34 and G45;

ALT represents a sum of the lens element thicknesses of the first lens element 1 to the fifth lens element 5 along the optical axis I, i.e., the sum of the five lens elements thicknesses T1, T2, T3, T4 and T5;

TL represents a distance from the object-side surface 15 of the first lens element 1 to the image-side surface 56 of the fifth lens element 5 along the optical axis I;

$T_{max}$ represents the maximum value among the thicknesses of the five lens elements, namely the first lens element 1 to the fifth lens element 5, along the optical axis I; and $T_{min}$ represents the minimum value among the thicknesses of the five lens elements, namely the first lens element 1 to the fifth lens element 5, along the optical axis I.

In addition, it is defined:

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
V1 is an Abbe number (also referred to as dispersion coefficient) of the first lens element 1;
V2 is an Abbe number of the second lens element 2;
V3 is an Abbe number of the third lens element 3;
V4 is an Abbe number of the fourth lens element 4; and
V5 is an Abbe number of the fifth lens element 5.

Then, referring to FIGS. 7A to 7D, FIG. 7A illustrates a longitudinal spherical aberration at the time when a pupil radius is 2.1645 mm in the first embodiment; FIGS. 7B and 7C respectively illustrate field curvature aberrations on the image plane 99 in a sagittal direction and in a tangential direction at wavelengths of 470 nm, 555 nm and 650 nm in the first embodiment; and FIG. 7D illustrates a distortion aberration on the image plane 99 at wavelengths of 470 nm, 555 nm and 650 nm in the first embodiment. In FIG. 7A that illustrates the longitudinal spherical aberration of the first embodiment, curves of each wavelength are close to one another and approach the center, which indicates that off-axis rays of each wavelength at different heights are concentrated around an imaging point. A deviation range of the curve of each wavelength indicates that deviations of the imaging points of the off-axis rays at different heights are controlled within a range of ±0.025 mm. Hence, it is evident that the spherical aberration at the same wavelength can be significantly improved according to the first embodiment. In addition, distances among the three representative wavelengths are quite close, which indicates that imaging positions of the rays of different wavelengths are rather concentrated; therefore, a chromatic aberration can be significantly improved as well.

In FIGS. 7B and 7C that illustrate the two field curvature aberrations, a focal length variation of the three representative wavelengths within the entire field of view falls within ±0.05 mm, which indicates that aberration of the optical system of the first embodiment can be effectively eliminated. In FIG. 7D, the diagram of distortion aberration shows that the distortion aberration of the first embodiment is maintained within a range of ±0.8%, which indicates that the distortion aberration of the first embodiment complies with an imaging quality requirement of the optical system. Accordingly, compared to the existing optical lenses, the first embodiment can still provide good imaging quality under a condition that that the system length is shortened to about 12.680 mm. Therefore, according to the first embodiment, a lens length can be shortened and favorable imaging quality can still be provided, while good optical properties are maintained.

FIG. 10 is a schematic diagram illustrating an optical imaging lens according to a second embodiment of the disclosure, and FIGS. 11A to 11D are diagrams illustrating a longitudinal spherical aberration and various aberrations of the optical imaging lens according to the second embodiment. Referring first to FIG. 10, the optical imaging lens 10 according to the second embodiment of the disclosure is roughly similar to that of the first embodiment, but the two differ in the following: the Abbe numbers of the second lens element 2 differ (the Abbe number V2 of the second lens element 2 of the second embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, a periphery region 253 of the second lens element 2 is convex. A periphery region 363 of the image-side surface 36 of the third lens element 3 is convex. It should be noted that, for clear illustration, some of the reference numerals of the optical axis regions and the periphery regions having similar surface shapes with those of the first embodiment are omitted from FIG. 10.

The detailed optical data of the optical imaging lens 10 of the second embodiment is as shown in FIG. 12. Moreover, in the optical imaging lens 10 of the second embodiment, the EFL of the whole system is 13.373 mm, the HFOV is 10.463°, the Fno is 3.330, the system length is 12.043 mm, and the image height is 2.502 mm.

FIG. 13 shows the various aspheric coefficients of the object-side surface 15 of the first lens element 1 to the image-side surface 56 of the fifth lens element 5 in Formula (1) in the second embodiment.

In addition, relations of important parameters in the optical imaging lens 10 of the second embodiment are as shown in FIGS. 46 and 47.

In FIG. 11A that illustrates the longitudinal spherical aberration at the time when the pupil radius is 2.0080 mm in the second embodiment, deviations of the imaging points of the off-axis rays at different heights are controlled within a range of ±0.025 mm. In FIGS. 11B and 11C that illustrate the two field curvature aberrations, the focal length variation of the three representative wavelengths within the entire field of view falls within ±0.04 mm. In FIG. 11D, the diagram of distortion aberration shows that the distortion aberration of the second embodiment is maintained within a range of ±1.4%.

It is clear from the above descriptions that the system length of the second embodiment is shorter than the system length of the first embodiment. The Fno of the second embodiment is greater than the Fno of the first embodiment. The field curvature aberrations of the second embodiment are smaller than the field curvature aberrations of the first embodiment.

FIG. 14 is a schematic diagram illustrating an optical imaging lens according to a third embodiment of the disclosure, and FIGS. 15A to 15D are diagrams illustrating a longitudinal spherical aberration and various aberrations of the optical imaging lens according to the third embodiment. Referring first to FIG. 14, the optical imaging lens 10 according to the third embodiment of the disclosure is roughly similar to that of the first embodiment, but the two differ in the following: the Abbe numbers of the second lens element 2 differ (the Abbe number V2 of the second lens element 2 of the third embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, an optical axis region 252 of the object-side surface 25 the second lens element 2 is concave. An optical axis region 361 of the image-side surface 36 of the third lens element 3 is convex, and its periphery region 363 is convex. It should be noted that, for clear illustration, some of the reference numerals of the optical axis regions and the periphery regions having similar surface shapes with those of the first embodiment are omitted from FIG. 14.

The detailed optical data of the optical imaging lens 10 of the third embodiment is as shown in FIG. 16. Moreover, in the optical imaging lens 10 of the third embodiment, the EFL of the whole system is 19.971 mm, the HFOV is 7.205°, the Fno is 3.468, the system length is 18.836 mm, and the image height is 2.502 mm.

FIG. 17 shows the various aspheric coefficients of the object-side surface 15 of the first lens element 1 to the image-side surface 56 of the fifth lens element 5 in Formula (1) in the third embodiment.

In addition, relations of important parameters in the optical imaging lens 10 of the third embodiment are as shown in FIGS. 46 and 47.

In FIG. 15A that illustrates the longitudinal spherical aberration at the time when the pupil radius is 2.8791 mm in the third embodiment, deviations of the imaging points of the off-axis rays at different heights are controlled within a range of ±0.045 mm. In FIGS. 15B and 15C that illustrate the two field curvature aberrations, the focal length variation of the three representative wavelengths within the entire field of view falls within ±0.07 mm. In FIG. 15D, the diagram of distortion aberration shows that the distortion aberration of the third embodiment is maintained within a range of ±1.0%.

According to the above, it is known that the HFOV of the third embodiment is smaller than the HFOV of the first embodiment. Therefore, compared with the first embodiment, the third embodiment has greater magnifying power.

FIG. 18 is a schematic diagram illustrating an optical imaging lens according to a fourth embodiment of the disclosure, and FIGS. 19A to 19D are diagrams illustrating a longitudinal spherical aberration and various aberrations of the optical imaging lens according to the fourth embodiment. Referring first to FIG. 18, the optical imaging lens 10 according to the fourth embodiment of the disclosure is roughly similar to that of the first embodiment, but the two differ in the following: the Abbe numbers of the second lens element 2 differ (the Abbe number V2 of the second lens element 2 of the fourth embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, the optical axis region 252 of the object-side surface 25 the second lens element 2 is concave. It should be noted that, for clear illustration, some of the reference numerals of the optical axis regions and the periphery regions having similar surface shapes with those of the first embodiment are omitted from FIG. 18.

The detailed optical data of the optical imaging lens 10 of the fourth embodiment is as shown in FIG. 20. Moreover, in the optical imaging lens 10 of the fourth embodiment, the EFL of the whole system is 14.508 mm, the HFOV is 9.761°, the Fno is 3.340, the system length is 12.689 mm, and the image height is 2.502 mm.

FIG. 21 shows the various aspheric coefficients of the object-side surface 15 of the first lens element 1 to the image-side surface 56 of the fifth lens element 5 in Formula (1) in the fourth embodiment.

In addition, relations of important parameters in the optical imaging lens 10 of the fourth embodiment are as shown in FIGS. 46 and 47.

In FIG. 19A that illustrates the longitudinal spherical aberration at the time when the pupil radius is 2.1717 mm in the fourth embodiment, deviations of the imaging points of the off-axis rays at different heights are controlled within a range of ±0.03 mm. In FIGS. 19B and 19C that illustrate the two field curvature aberrations, the focal length variation of the three representative wavelengths within the entire field of view falls within ±0.1 mm. In FIG. 19D, the diagram of distortion aberration shows that the distortion aberration of the fourth embodiment is maintained within a range of ±0.2%.

It is clear from the above descriptions that the distortion aberration of the fourth embodiment is smaller than the distortion aberration of the first embodiment.

FIG. 22 is a schematic diagram illustrating an optical imaging lens according to a fifth embodiment of the disclosure, and FIGS. 23A to 23D are diagrams illustrating a longitudinal spherical aberration and various aberrations of the optical imaging lens according to the fifth embodiment. Referring first to FIG. 22, the optical imaging lens 10 according to the fifth embodiment of the disclosure is roughly similar to that of the first embodiment, but the two differ in the following: the Abbe numbers of the second lens element 2 differ (the Abbe number V2 of the second lens element 2 of the fifth embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, the optical axis region 252 of the object-side surface 25 the second lens element 2 is concave. The optical axis region 361 of the image-side surface 36 of the third lens element 3 is convex. It should be noted that, for clear illustration, some of the reference numerals of the optical axis regions and the periphery regions having similar surface shapes with those of the first embodiment are omitted from FIG. 22.

The detailed optical data of the optical imaging lens 10 of the fifth embodiment is as shown in FIG. 24. Moreover, in the optical imaging lens 10 of the fifth embodiment, the EFL of the whole system is 14.411 mm, the HFOV is 9.760°, the Fno is 3.340, the system length is 13.091 mm, and the image height is 2.502 mm.

FIG. 25 shows the various aspheric coefficients of the object-side surface 15 of the first lens element 1 to the image-side surface 56 of the fifth lens element 5 in Formula (1) in the fifth embodiment.

In addition, relations of important parameters in the optical imaging lens 10 of the fifth embodiment are as shown in FIGS. 46 and 47.

In FIG. 23A that illustrates the longitudinal spherical aberration at the time when the pupil radius is 2.1573 mm in the fifth embodiment, deviations of the imaging points of the off-axis rays at different heights are controlled within a range of ±0.03 mm. In FIGS. 23B and 23C that illustrate the two field curvature aberrations, the focal length variation of the three representative wavelengths within the entire field of view falls within ±0.18 mm. In FIG. 23D, the diagram of distortion aberration shows that the distortion aberration of the fifth embodiment is maintained within a range of ±1.0%.

It is clear from the above descriptions that the fifth embodiment is easier to manufacture than the first embodiment, so the fifth embodiment has a higher yield.

FIG. 26 is a schematic diagram illustrating an optical imaging lens according to a sixth embodiment of the disclosure, and FIGS. 27A to 27D are diagrams illustrating a longitudinal spherical aberration and various aberrations of the optical imaging lens according to the sixth embodiment. Referring first to FIG. 26, the optical imaging lens 10 according to the sixth embodiment of the disclosure is roughly similar to that of the first embodiment, but the two differ in the following: the Abbe numbers of the second lens element 2 differ (the Abbe number V2 of the second lens element 2 of the sixth embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, the periphery region 253 of the object-side surface 25 the second lens element 2 is convex. The periphery region 363 of the image-side surface 36 of the third lens element 3 is convex. It should be noted that, for clear illustration, some of the reference numerals of the optical axis regions and the periphery regions having similar surface shapes with those of the first embodiment are omitted from FIG. 26.

The detailed optical data of the optical imaging lens 10 of the sixth embodiment is as shown in FIG. 28. Moreover, in the optical imaging lens 10 of the sixth embodiment, the EFL of the whole system is 13.121 mm, the HFOV is 10.645°, the Fno is 3.251, the system length is 12.122 mm, and the image height is 2.502 mm.

FIG. 29 shows the various aspheric coefficients of the object-side surface 15 of the first lens element 1 to the image-side surface 56 of the fifth lens element 5 in Formula (1) in the sixth embodiment.

In addition, relations of important parameters in the optical imaging lens 10 of the sixth embodiment are as shown in FIGS. 48 and 49.

In FIG. 27A that illustrates the longitudinal spherical aberration at the time when the pupil radius is 2.0181 mm in the sixth embodiment, deviations of the imaging points of the off-axis rays at different heights are controlled within a range of ±0.025 mm. In FIGS. 27B and 27C that illustrate the two field curvature aberrations, the focal length variation of the three representative wavelengths within the entire field of view falls within ±0.05 mm. In FIG. 27D, the diagram of distortion aberration shows that the distortion aberration of the sixth embodiment is maintained within a range of ±1.6%.

It is clear from the above descriptions that the system length of the sixth embodiment is shorter than the system length of the first embodiment. The Fno of the sixth embodiment is greater than the Fno of the first embodiment.

FIG. 30 is a schematic diagram illustrating an optical imaging lens according to a seventh embodiment of the disclosure, and FIGS. 31A to 32D are diagrams illustrating a longitudinal spherical aberration and various aberrations of the optical imaging lens according to the seventh embodiment. Referring first to FIG. 30, the optical imaging lens 10 according to the seventh embodiment of the disclosure is roughly similar to that of the first embodiment, but the two differ in the following: the Abbe numbers of the second lens element 2 differ (the Abbe number V2 of the second lens element 2 of the seventh embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, the periphery region 363 of the image-side surface 36 the third lens element 3 is convex. It should be noted that, for clear illustration, some of the reference numerals of the optical axis regions and the periphery regions having similar surface shapes with those of the first embodiment are omitted from FIG. 30.

The detailed optical data of the optical imaging lens 10 of the seventh embodiment is as shown in FIG. 32. Moreover, in the optical imaging lens 10 of the seventh embodiment, the EFL of the whole system is 14.471 mm, the HFOV is 9.760°, the Fno is 3.350, the system length is 13.173 mm, and the image height is 2.502 mm.

Figure 33:
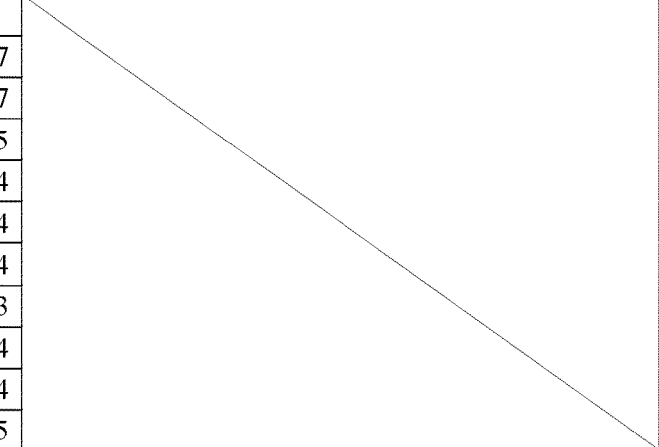
FIG. 33 shows aspheric parameters pertaining to the optical imaging lens according to the seventh embodiment of the disclosure.

FIG. 33 shows the various aspheric coefficients of the object-side surface 15 of the first lens element 1 to the image-side surface 56 of the fifth lens element 5 in Formula (1) in the seventh embodiment.

In addition, relations of important parameters in the optical imaging lens 10 of the seventh embodiment are as shown in FIGS. 48 and 49.

In FIG. 31A that illustrates the longitudinal spherical aberration at the time when the pupil radius is 2.1598 mm in the seventh embodiment, deviations of the imaging points of the off-axis rays at different heights are controlled within a range of ±0.025 mm. In FIGS. 31B and 31C that illustrate the two field curvature aberrations, the focal length variation of the three representative wavelengths within the entire field of view falls within ±0.1 mm. In FIG. 31D, the diagram of distortion aberration shows that the distortion aberration of the seventh embodiment is maintained within a range of ±0.6%.

It is clear from the above descriptions that the distortion aberration of the seventh embodiment is smaller than the distortion aberration of the first embodiment.

FIG. 34 is a schematic diagram illustrating an optical imaging lens according to an eighth embodiment of the disclosure, and FIGS. 35A to 35D are diagrams illustrating a longitudinal spherical aberration and various aberrations of the optical imaging lens according to the eighth embodiment. Referring first to FIG. 30, the optical imaging lens 10 according to the eighth embodiment of the disclosure is roughly similar to that of the first embodiment, but the two differ in the following: the Abbe numbers of the second lens element 2 differ (the Abbe number V2 of the second lens element 2 of the eighth embodiment is 22.409, while the Abbe number V2 of the second lens element 2 of the first embodiment is 20.373). Besides, the optical data, the aspheric coefficients and the parameters of the lens elements 1, 2, 3, 4, and 5 in the two embodiments are different to some extent. In addition, in the present embodiment, the optical axis region 252 of the object-side surface 25 the second lens element 2 is concave. It should be noted that, for clear illustration, some of the reference numerals of the optical axis regions and the periphery regions having similar surface shapes with those of the first embodiment are omitted from FIG. 34.

The detailed optical data of the optical imaging lens 10 of the eighth embodiment is as shown in FIG. 36. Moreover, in the optical imaging lens 10 of the eighth embodiment, the EFL of the whole system is 15.147 mm, the HFOV is 9.362°, the Fno is 3.347, the system length is 13.501 mm, and the image height is 2.502 mm.

FIG. 37 shows the various aspheric coefficients of the object-side surface 15 of the first lens element 1 to the image-side surface 56 of the fifth lens element 5 in Formula (1) in the eighth embodiment.

In addition, relations of important parameters in the optical imaging lens 10 of the eighth embodiment are as shown in FIGS. 48 and 49.

In FIG. 35A that illustrates the longitudinal spherical aberration at the time when the pupil radius is 2.2629 mm in the eighth embodiment, deviations of the imaging points of the off-axis rays at different heights are controlled within a range of ±0.03 mm. In FIGS. 35B and 35C that illustrate the two field curvature aberrations, the focal length variation of the three representative wavelengths within the entire field of view falls within ±0.1 mm. In FIG. 35D, the diagram of distortion aberration shows that the distortion aberration of the eighth embodiment is maintained within a range of ±0.18%.

According to the above, it is known that the HFOV of the eighth embodiment is smaller than the HFOV of the first embodiment. Therefore, compared with the first embodiment, the eighth embodiment has greater magnifying power. The distortion aberrations of the eighth embodiment are smaller than the distortion aberrations of the first embodiment.

FIG. 38 is a schematic diagram illustrating an optical imaging lens according to a ninth embodiment of the disclosure, and FIGS. 39A to 39D are diagrams illustrating a longitudinal spherical aberration and various aberrations of the optical imaging lens according to the ninth embodiment. Referring first to FIG. 38, the optical imaging lens 10 according to the ninth embodiment of the disclosure is roughly similar to that of the first embodiment, but the two differ in the following: the Abbe numbers of the second lens element 2, the third lens element 3, and the fifth lens element 5 differ (the Abbe number V2 of the second lens element 2 is 22.409, the Abbe number V3 of the third lens element 3 is 22.409, and the Abbe number V5 of the fifth lens element 5 is 55.987 in the ninth embodiment, while the Abbe number V2 of the second lens element 2 is 20.373, the Abbe number V3 of the third lens element 3 is 55.987, and the Abbe number V5 of the fifth lens element 5 is 22.409 in the first embodiment). Besides, the optical data, the aspheric coefficients and the parameters of the lens elements 1, 2, 3, 4, and 5 in the two embodiments are different to some extent. In addition, in the present embodiment, the optical axis region 252 of the object-side surface 25 the second lens element 2 is concave. The optical axis region 361 of the image-side surface 36 of the third lens element 3 is convex, and its periphery region 363 is convex. A periphery region 564 of the image-side surface 56 of the fifth lens element 5 is concave. It should be noted that, for clear illustration, some of the reference numerals of the optical axis regions and the periphery regions having similar surface shapes with those of the first embodiment are omitted from FIG. 38.

The detailed optical data of the optical imaging lens 10 of the ninth embodiment is as shown in FIG. 40. Moreover, in the optical imaging lens 10 of the ninth embodiment, the EFL of the whole system is 13.032 mm, the HFOV is 10.945°, the Fno is 3.345, the system length is 13.332 mm, and the image height is 2.502 mm.

FIG. 41 shows the various aspheric coefficients of the object-side surface 15 of the first lens element 1 to the image-side surface 56 of the fifth lens element 5 in Formula (1) in the ninth embodiment.

In addition, relations of important parameters in the optical imaging lens 10 of the ninth embodiment are as shown in FIGS. 48 and 49.

In FIG. 39A that illustrates the longitudinal spherical aberration at the time when the pupil radius is 1.9480 mm in the ninth embodiment, deviations of the imaging points of the off-axis rays at different heights are controlled within a range of ±0.07 mm. In FIGS. 39B and 39C that illustrate the two field curvature aberrations, the focal length variation of the three representative wavelengths within the entire field of view falls within ±0.1 mm. In FIG. 39D, the diagram of distortion aberration shows that the distortion aberration of the ninth embodiment is maintained within a range of ±0.8%.

It is clear from the above descriptions that the lens optical axis and the thickness difference of the periphery region of the ninth embodiment are smaller than those of the first embodiment. Therefore, the optical imaging lens of the ninth embodiment is easier to manufacture and consequently has a higher yield.

FIG. 42 is a schematic diagram illustrating an optical imaging lens according to a tenth embodiment of the disclosure, and FIGS. 43A to 43D are diagrams illustrating a longitudinal spherical aberration and various aberrations of the optical imaging lens according to the tenth embodiment. Referring first to FIG. 42, the optical imaging lens 10 according to the tenth embodiment of the disclosure is roughly similar to that of the first embodiment, but the two differ in the following: the Abbe numbers of the second lens element 2 and the third lens element 3 differ (the Abbe number V2 of the second lens element 2 is 22.409 and the Abbe number V3 of the third lens element 3 is 22.409 in the tenth embodiment, while the Abbe number V2 of the second lens element 2 is 20.373 and the Abbe number V3 of the third lens element 3 is 55.987 in the first embodiment). Besides, the optical data, the aspheric coefficients and the parameters of the lens elements 1, 2, 3, 4, and 5 in the two embodiments are different to some extent. In addition, in the present embodiment, the optical axis region 252 of the object-side surface 25 the second lens element 2 is concave. A periphery region 453 of the object-side surface 45 of the fourth lens element 4 is convex. It should be noted that, for clear illustration, some of the reference numerals of the optical axis regions and the periphery regions having similar surface shapes with those of the first embodiment are omitted from FIG. 42.

The detailed optical data of the optical imaging lens 10 of the tenth embodiment is as shown in FIG. 44. Moreover, in the optical imaging lens 10 of the tenth embodiment, the EFL of the whole system is 13.008 mm, the HFOV is 10.888°, the Fno is 3.343, the system length is 12.652 mm, and the image height is 2.502 mm.

FIG. 45 shows the various aspheric coefficients of the object-side surface 15 of the first lens element 1 to the image-side surface 56 of the fifth lens element 5 in Formula (1) in the tenth embodiment.

In addition, relations of important parameters in the optical imaging lens 10 of the tenth embodiment are as shown in FIGS. 48 and 49.

In FIG. 43A that illustrates the longitudinal spherical aberration at the time when the pupil radius is 1.9454 mm in the tenth embodiment, deviations of the imaging points of the off-axis rays at different heights are controlled within a range of ±0.16 mm. In FIGS. 43B and 43C that illustrate the two field curvature aberrations, the focal length variation of the three representative wavelengths within the entire field of view falls within ±0.18 mm. In FIG. 43D, the diagram of distortion aberration shows that the distortion aberration of the tenth embodiment is maintained within a range of ±0.16%.

It is clear from the above descriptions that the system length of the tenth embodiment is shorter than the system length of the first embodiment, and the distortion aberration of the tenth embodiment is smaller than the distortion aberration of the first embodiment.

Referring to FIGS. 46, 47, 48, and 49, FIGS. 46, 47, 48, and 49 are tables listing the respective optical parameters of the first embodiment to the tenth embodiment.

In order to reduce the length of the lens system and ensure the imaging quality, it is also a means of the disclosure to reduce the air gap between lens elements or properly reduce the thickness of a lens element. In the meantime, in consideration of manufacturing difficulty, if the limitation of numerals as set forth in the conditions below is satisfied, a favorable configuration may be attained.

In the optical imaging lens 10 according to the embodiments of the disclosure, the following condition is also met: (T1+T3)/(T2+T4+T5)≥1.000, preferably 1.000≤(T1+T3)/(T2+T4+T5)≤2.540.

In the optical imaging lens 10 according to the embodiments of the disclosure, the following condition is also met: TTL/(G12+T3)≤9.010, preferably 1.000≤(T1+T3)/(T2+T4+T5)≤2.540.

In the optical imaging lens 10 according to the embodiments of the disclosure, the following condition is also met: TL/BFL≤2.000, preferably 0.820≤TL/BFL≤2.000.

In the optical imaging lens 10 according to the embodiments of the disclosure, the following condition is also met: EFL/(T2+G23+T3+G34+T4+G45+T5)≥3.000, preferably 3.000≤EFL/(T2+G23+T3+G34+T4+G45+T5)≤5.210.

In the optical imaging lens 10 according to the embodiments of the disclosure, the following condition is also met: TTL/AAG≥5.000, preferably 5.000≤TTL/AAG≤15.700.

In the optical imaging lens 10 according to the embodiments of the disclosure, the following condition is also met: EFL/AAG≥5.500, preferably 5.500≤EFL/AAG≤17.000.

In the optical imaging lens 10 according to the embodiments of the disclosure, the following condition is also met: (T1+T3+T4+T5)/AAG≥1.500, preferably 1.500≤(T1+T3+T4+T5)/AAG≥5.680.

In the optical imaging lens 10 according to the embodiments of the disclosure, the following condition is also met: T1/(G34+T4)≥1.500, preferably 1.500≤T1/(G34+T4)≤4.030.

In the optical imaging lens 10 according to the embodiments of the disclosure, the following condition is also met: T3/(T2+T5)≥0.700, preferably 0.700≤T3/(T2+T5)≤1.800.

In the optical imaging lens 10 according to the embodiments of the disclosure, the following condition is also met: ALT/G12≤10.000, preferably 2.130≤ALT/G12≤10.000.

In the optical imaging lens 10 according to the embodiments of the disclosure, the following condition is also met: EFL/(T1+T3+T5)≥3.000, preferably 3.000≤EFL/(T1+T3+T5)≤4.640.

In the optical imaging lens 10 according to the embodiments of the disclosure, the following condition is also met: TL/(T1+G12)≤3.000, preferably 1.670≤TL/(T1+G12)≤3.000.

In the optical imaging lens 10 according to the embodiments of the disclosure, the following condition is also met: TTL/(G23+G34+G45)≥10.000, preferably 10.000≤TTL/(G23+G34+G45)≤50.000.

In the optical imaging lens 10 according to the embodiments of the disclosure, the following condition is also met: (T2+T3)/(G23+G34)≥1.000, preferably 1.000≤(T2+T3)/(G23+G34)≤13.000.

In the optical imaging lens 10 according to the embodiments of the disclosure, the following condition is also met: BFL/(G12+G23+G45)≥3.000, preferably 3.000≤BFL/(G12+G23+G45)≤12.000.

In the optical imaging lens 10 according to the embodiments of the disclosure, the following condition is also met: (T1+G12)/(T4+G45+T5)≥1.500, preferably 1.500≤(T1+G12)/(T4+G45+T5)≤4.030.

In the optical imaging lens 10 according to the embodiments of the disclosure, the following condition is also met: (T1+G12)/(T2+T4)≥2.500, preferably 2.500≤(T1+G12)/(T2+T4)≤5.380.

In addition, it is optional to select a random combination relationship of the parameter in the embodiment to increase limitation of the lens for the ease of designing the lens having the same structure in the disclosure. Due to the unpredictability in the design of an optical system, with the framework of the embodiments of the disclosure, under the circumstances where the above-described conditions are satisfied, the optical imaging system according to the embodiments of the disclosure has a telephoto lens with a reduced depth, a larger aperture, higher imaging quality, or a higher yield with respect to the conventional art.

One or more of the exemplary relations defined above may also be selectively combined and applied to the embodiments of the disclosure in various manners. The invention does not intend to impose a limitation on this regard. In implementation of the disclosure, apart from the above-described relations, it is also possible to additionally design other detailed structures such as arrangements of more concave and convex curvatures specifically for a single lens element or generally for a plurality of lens elements, so as to enhance control of system property and/or resolution. It should be noted that these details can be optionally combined and applied to the other embodiments of the disclosure under the condition where they are not in conflict with one another.

In view of the foregoing, the optical imaging lens 10 according to the embodiments of the disclosure can provide the following effects and advantages:

1. The longitudinal spherical aberrations, the astigmatic aberrations, and the distortion aberrations provided in the embodiments of the disclosure all comply with usage specifications. Besides, the off-axis rays of the representative wavelengths, i.e., red, green, and blue, at different heights are concentrated around the imaging point. The deviation range of each curve indicates that the deviations of the imaging points of the off-axis rays at different heights are controlled, and favorable spherical aberration, image aberration, and distortion suppressions are rendered. The imaging quality data further suggest that the distances among the three representative wavelengths, i.e., red, green, and blue, are also very close to each other, suggesting that the embodiments of the disclosure are able to desirably concentrate rays of different wavelengths in various states and exhibit an excellent chromatic dispersion suppressing ability. Based on the above, the embodiments of the disclosure bring forth excellent imaging quality through the design and matching of the lens elements.

2. In the optical imaging lens according to the embodiments of the disclosure, the periphery region 164 of the image-side surface 16 of the first lens element 1 is designed to be concave, the periphery region 464 of the image-side surface 46 of the fourth lens element 4 is designed to be concave, the periphery region 551 of the object-side surface 55 of the fifth lens element 5 is designed to be convex, and the optical axis region 561 of the image-side surface 56 of the fifth lens element 5 is designed to be convex, while the twice of the Abbe number of the fourth lens element 4 is greater than the sum of the Abbe number of the second lens element 2, the Abbe number of the third lens element 3, and the Abbe number of the fifth lens element 5, and the optical imaging lens according to the embodiments of the disclosure further satisfy at least one of following three designs, design 1: the optical axis region 262 of the image-side surface 26 of the second lens element 2 is designed as concave, design 2: the refracting power of the fourth lens element 4 is designed as negative, or design 3: the optical axis region 462 of the image-side surface 46 of the fourth lens element 4 is designed as concave. Accordingly, in addition to increasing the system focal length, the entire optical lens system is able to render favorable imaging quality and increase the assemblability and the manufacturing yield.

All of the numerical ranges including the maximum and minimum values and the values therebetween which are obtained from the combining proportion relation of the optical parameters disclosed in each embodiment of the disclosure are implementable.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An optical imaging lens, comprising a first lens element, a second lens element, a third lens element, a fourth lens element, and a fifth lens element arranged in sequence from an object side to an image side along an optical axis, wherein each of the first lens element to the fifth lens element comprises an object-side surface facing the object side and allowing an imaging ray to pass through and an image-side surface facing the image side and allowing the imaging ray to pass through, and only the first lens element to the fifth lens element have refracting power among lens elements of the optical imaging lens, a periphery region of the image-side surface of the first lens element is concave, an optical axis region of the image-side surface of the second lens element is concave, a periphery region of the image-side surface of the fourth lens element is concave, and a periphery region of the object-side surface of the fifth lens element is convex and an optical axis region of the image-side surface of the fifth lens element is convex, wherein, twice of an Abbe number of the fourth lens element is greater than a sum of an Abbe number of the second lens element, an Abbe number of the third lens element, and an Abbe number of the fifth lens element, wherein the optical imaging lens further satisfies a following condition: $TTL/(G12+T3) \leq 9.010$, wherein TTL represents a distance from the object-side surface of the first lens element to an image plane along the optical axis, G12 represents an air gap between the first lens element and the second lens element along the optical axis, and T3 represents a thickness of the third lens element along the optical axis.

2. The optical imaging lens according to claim 1, wherein the optical imaging lens further satisfies a following condition:

$(T1+T3)/(T2+T4+T5) \geq 1.000$, wherein T1 represents a thickness of the first lens element along the optical axis, T2 represents a thickness of the second lens element along the optical axis, T4 represents a thickness of the fourth lens element along the optical axis, and T5 represents a thickness of the fifth lens element along the optical axis.

3. The optical imaging lens according to claim 1, wherein the optical imaging lens further satisfies a following condition: $TL/BFL \leq 2.000$, wherein TL represents a distance from the object-side surface of the first lens element to the image-side surface of the fifth lens element along the optical axis, and BFL represents a distance from the image-side surface of the fifth lens element to the image plane along the optical axis.

4. The optical imaging lens according to claim 1, wherein the optical imaging lens further satisfies a following condition: $EFL/(T2+G23+T3+G34+T4+G45+T5) \geq 3.000$, wherein EFL represents an effective focal length of the optical imaging lens, T2 represents a thickness of the second lens element along the optical axis, G23 represents an air gap between the second lens element and the third lens element along the optical axis, G34 represents an air gap between the third lens element and the fourth lens element along the optical axis, T4 represents a thickness of the fourth lens element along the optical axis, G45 represents an air gap between the fourth lens element and the fifth lens element along the optical axis, and T5 represents a thickness of the fifth lens element along the optical axis.

5. The optical imaging lens according to claim 1, wherein the optical imaging lens further satisfies a following condition: $TTL/AAG \geq 5.000$, wherein AAG represents an air gap sum of an air gap between the first lens element and the second lens element along the optical axis, an air gap between the second lens element and the third lens element along the optical axis, an air gap between the third lens element and the fourth lens element along the optical axis, and an air gap between the fourth lens element and the fifth lens element along the optical axis.

6. The optical imaging lens according to claim 1, wherein the optical imaging lens further satisfies a following condition: $EFL/AAG \geq 5.500$, wherein EFL represents an effective focal length of the optical imaging lens, and AAG represents an air gap sum of an air gap between the first lens element and the second lens element along the optical axis, an air gap between the second lens element and the third lens element along the optical axis, an air gap between the third lens element and the fourth lens element along the optical axis, and an air gap between the fourth lens element and the fifth lens element along the optical axis.

7. An optical imaging lens, comprising a first lens element, a second lens element, a third lens element, a fourth lens element, and a fifth lens element arranged in sequence from an object side to an image side along an optical axis, wherein each of the first lens element to the fifth lens element comprises an object-side surface facing the object side and allowing an imaging ray to pass through and an image-side surface facing the image side and allowing the imaging ray to pass through, and only the first lens element to the fifth lens element have refracting power among lens elements of the optical imaging lens, a periphery region of the image-side surface of the first lens element is concave, the fourth lens element has negative refracting power, and a periphery region of the image-side surface of the fourth lens element is concave, a periphery region of the object-side surface of the fifth lens element is convex and an optical axis region of the image-side surface of the fifth lens element is convex, wherein, twice of an Abbe number of the fourth lens element is greater than a sum of an Abbe number of the second lens element, an Abbe number of the third lens element, and an Abbe number of the fifth lens element, wherein the optical imaging lens further satisfies a following condition: $TTL/(G12+T3) \leq 9.010$, wherein TTL represents a distance from the object-side surface of the first lens element to an image plane along the optical axis, G12 represents an air gap between the first lens element and the second lens element along the optical axis, and T3 represents a thickness of the third lens element along the optical axis.

8. The optical imaging lens according to claim 7, wherein the optical imaging lens further satisfies a following condition: $(T1+T3+T4+T5)/AAG \geq 1.500$, wherein T1 represents a thickness of the first lens element along the optical axis, T4 represents a thickness of the fourth lens element along the optical axis, T5 represents a thickness of the fifth lens element along the optical axis, and AAG represents an air gap sum of an air gap between the first lens element and the second lens element along the optical axis, an air gap between the second lens element and the third lens element along the optical axis, an air gap between the third lens element and the fourth lens element along the optical axis, and an air gap between the fourth lens element and the fifth lens element along the optical axis.

9. The optical imaging lens according to claim 7, wherein the optical imaging lens further satisfies a following condition: $T1/(G4+T4) \geq 1.500$, wherein T1 represents a thickness of the first lens element along the optical axis, G34 represents an air gap between the third lens element and the fourth lens element along the optical axis, and T4 represents a thickness of the fourth lens element along the optical axis.

10. The optical imaging lens as claimed in claim 7, wherein the optical imaging lens further satisfies a following condition: $T3/(T2+T5) \geq 0.700$, wherein T2 represents a thickness of the second lens element along the optical axis, and T5 represents a thickness of the fifth lens element along the optical axis.

11. The optical imaging lens according to claim 7, wherein the optical imaging lens further satisfies a following condition: $ALT/G12 \leq 10.000$, wherein ALT represents a lens element thickness sum of a thickness of the first lens element along the optical axis, a thickness of the second lens element along the optical axis, a thickness of the third lens element along the optical axis, a thickness of the fourth lens element along the optical axis, and a thickness of the fifth lens element along the optical axis.

12. The optical imaging lens according to claim 7, wherein the optical imaging lens further satisfies a following condition: $EFL/(T1+T3+T5) \geq 3.000$, wherein EFL represents an effective focal length of the optical imaging lens, T1 represents a thickness of the first lens element along the optical axis, and T5 represents a thickness of the fifth lens element along the optical axis.

13. The optical imaging lens as claimed in claim 7, wherein the optical imaging lens further satisfies a following condition: $TL/(T1+G12) \leq 3,000$, TL represents a distance from the object-side surface of the first lens element to the image-side surface of the fifth lens element along the optical axis, and T1 represents a thickness of the first lens element along the optical axis.

14. An optical imaging lens, comprising a first lens element, a second lens element, a third lens element, a fourth lens element, and a fifth lens element arranged in sequence from an object side to an image side along an optical axis, wherein each of the first lens element to the fifth lens element comprises an object-side surface facing the object side and allowing an imaging ray to pass through and an image-side surface facing the image side and allowing the imaging ray to pass through, and only the first lens element to the fifth lens element have refracting power among lens elements of the optical imaging lens, a periphery region of the image-side surface of the first lens element is concave, an optical axis region of the image-side surface of the fourth lens element is concave, and a periphery region of the image-side surface of the fourth lens element is concave, a periphery region of the object-side surface of the fifth lens element is convex and an optical axis region of the image-side surface of the fifth lens element is convex, wherein, twice of an Abbe number of the fourth lens element is greater than a sum of an Abbe number of the second lens element, an Abbe number of the third lens element, and an Abbe number of the fifth lens element and, the optical imaging lens further satisfies a following condition: $TTL/(G12+T3) \leq 9.010$, wherein TTL represents a distance from the object-side surface of the first lens element to an image plane along the optical axis, G12 represents an air gap between the first lens element and the second lens element along the optical axis, and T3 represents a thickness of the third lens element along the optical axis.

15. The optical imaging lens according to claim 14, wherein the optical imaging lens further satisfies a following condition: $TTL/(G23+G34+G45) \geq 10.000$, wherein G23 represents an air gap between the second lens element and the third lens element along the optical axis, G34 represents an air gap between the third lens element and the fourth lens element along the optical axis, and G45 represents an air gap between the fourth lens element and the fifth lens element along the optical axis.

16. The optical imaging lens according to claim 14, wherein the optical imaging lens further satisfies a following condition: $(T2+T3)/(G23+G34) \geq 1.000$, wherein T2 represents a thickness of the second lens element along the optical axis, G23 represents an air gap between the second lens element and the third lens element along the optical axis, and G34 represents an air gap between the third lens element and the fourth lens element along the optical axis.

17. The optical imaging lens according to claim 14, wherein the optical imaging lens further satisfies a following condition: $BFL/(G12+G23+G45) \geq 3.000$, wherein BFL represents a distance from the image-side surface of the fifth lens element to the image plane along the optical axis, G23 represents an air gap between the second lens element and the third lens element along the optical axis, and G45 represents an air gap between the fourth lens element and the fifth lens element along the optical axis.

18. The optical imaging lens according to claim 14, wherein the optical imaging lens further satisfies a following condition: $(T1+G12)/(T4+G45+T5) \geq 1.500$, wherein T1 represents a thickness of the first lens element along the optical axis, T4 represents a thickness of the fourth lens element along the optical axis, G45 represents an air gap between the fourth lens element and the fifth lens element along the optical axis, and T5 represents a thickness of the fifth lens element along the optical axis.

19. The optical imaging lens according to claim 14, wherein the optical imaging lens further satisfies a following condition: $(T1+G12)/(T2+T4) \geq 2.500$, wherein T1 represents a thickness of the first lens element along the optical axis, T2 represents a thickness of the second lens element along the optical axis, and T4 represents a thickness of the fourth lens element along the optical axis.

* * * * *